(12) United States Patent
Aoyama et al.

(10) Patent No.: US 8,416,557 B2
(45) Date of Patent: Apr. 9, 2013

(54) SOLID ELECTROLYTIC CAPACITOR AND METHOD FOR MANUFACTURING THE SAME

(75) Inventors: Tatsuji Aoyama, Kyoto (JP); Tsuyoshi Yoshino, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/679,712

(22) PCT Filed: Oct. 17, 2008

(86) PCT No.: PCT/JP2008/002944
§ 371 (c)(1),
(2), (4) Date: Mar. 24, 2010

(87) PCT Pub. No.: WO2009/060563
PCT Pub. Date: May 14, 2009

(65) Prior Publication Data
US 2010/0202102 A1    Aug. 12, 2010

(30) Foreign Application Priority Data

Nov. 6, 2007 (JP) ................................. 2007-288352
Nov. 6, 2007 (JP) ................................. 2007-288353

(51) Int. Cl.
*H01G 9/04* (2006.01)
*H01G 9/145* (2006.01)
(52) U.S. Cl. ........................................ 361/532; 29/25.03
(58) Field of Classification Search .......... 361/529–530, 361/532; 29/25.03
See application file for complete search history.

(56) References Cited

U.S. PATENT DOCUMENTS

| | | | |
|---|---|---|---|
| 4,580,855 A | 4/1986 | Niwa | |
| 6,226,173 B1 * | 5/2001 | Welsch et al. | 361/508 |
| 6,519,137 B1 | 2/2003 | Nitta et al. | |
| 7,643,270 B2 * | 1/2010 | Aoyama et al. | 361/532 |
| 2003/0007311 A1 | 1/2003 | Kojima et al. | |

FOREIGN PATENT DOCUMENTS

| | | |
|---|---|---|
| CN | 1396609 A | 2/2003 |
| JP | 58-123715 A | 7/1983 |
| JP | 4-7086 B2 | 2/1992 |
| JP | 05-190400 A | 7/1993 |
| JP | 06236831 A * | 8/1994 |
| JP | 10-270291 A | 10/1998 |
| JP | 2001-155967 A | 6/2001 |
| JP | 2003-045753 A | 2/2003 |

OTHER PUBLICATIONS

International Search Report for PCT/JP2008/002944.

* cited by examiner

*Primary Examiner* — Eric Thomas
(74) *Attorney, Agent, or Firm* — Pearne & Gordon LLP

(57) ABSTRACT

A solid electrolytic capacitor includes an anode foil, a solid electrolyte provided on the anode foil and made of conductive polymer, and a cathode foil provided on the solid electrolyte and facing the anode foil across the solid electrolyte. The anode foil includes an anode base made of aluminum, a rough surface layer made of aluminum and provided on a surface of the anode base, and a dielectric oxide layer provided on the rough surface layer and contacting the solid electrolyte. The cathode foil includes a cathode base made of aluminum, and a nickel layer provided on a surface of the cathode base and contacting the solid electrolyte. The nickel layer faces the dielectric oxide layer of the anode foil across the solid electrolyte. The nickel layer is made of nickel and nickel oxide. This solid electrolytic capacitor has a large capacitance and a low equivalent series resistance while being inexpensive and highly reliable.

16 Claims, 14 Drawing Sheets

|  | Capacitance (μF) | ESR (mΩ) |
|---|---|---|
| Embodiment 1 | 2000 | 4.1 |
| Embodiment 2 | 1960 | 6.0 |
| Embodiment 3 | 2020 | 3.2 |
| Embodiment 4 | 1980 | 5.3 |
| Comparative Example 1 | 510 | 8.0 |

|  | Capacitance (μF) | ESR (mΩ) |
|---|---|---|
| Embodiment 5 | 350 | 3.4 |
| Embodiment 6 | 330 | 4.1 |
| Embodiment 7 | 360 | 2.7 |
| Embodiment 8 | 330 | 3.9 |
| Comparative Example 2 | 180 | 4.5 |

PRIOR ART

SOLID ELECTROLYTIC CAPACITOR AND METHOD FOR MANUFACTURING THE SAME

This application is a U.S. National Stage Application of the PCT International Application No. PCT/JP2008/002944.

TECHNICAL FIELD

The present invention relates to a solid electrolytic capacitor including solid electrolyte made of conductive polymer, and to a method for manufacturing the capacitor.

BACKGROUND ART

As electronic apparatuses operate at higher frequencies, capacitors used in the apparatuses are demanded to have a lower equivalent series resistance (ESR), excellent impedance characteristics at the high frequencies, and large capacitance. To meet these demands, solid electrolytic capacitors employing solid electrolyte made of conductive polymer having higher electric conductivity have been developed.

A roll-type solid electrolytic capacitor has been in market to meet the demand of a large capacitance. This capacitor includes an anode foil, a cathode foil, and a separator which are wound together. This solid electrolytic capacitor is more excellent not only in its life time and temperature characteristics but also in high-frequency characteristics than other capacitors, accordingly being used in power supplies for personal computers. Patent Document 1 discloses a conventional roll-type solid electrolytic capacitor includes a cathode foil made of non-valve metal foil, such as nickel foil, which hardly has natural oxide layer thereon in order to increase a capacitance of the capacitor. This structure increases the electrostatic capacitance generated at the cathode foil to a substantially infinite value.

The non-valve metal foil disclosed in Patent Document 1 cannot be roughened by an etching process, and hence, can hardly increase an effective contact area between the cathode foil and the solid electrolyte. Thus, the solid electrolytic capacitor disclosed in Patent Document 1 is prevented from having a small ESR. Further, the nickel foil is more expensive than aluminum foil.

Patent Document 2 discloses another solid electrolytic capacitor including the cathode foil made of aluminum foil in order to overcome the foregoing problems. The surface of the aluminum foil can be roughened by an etching process, and can have a plated nickel layer, non-valve metal, formed on the roughened surface by a non-electrolytic plating method.

However, the nickel plated layer can hardly be formed uniformly inside pores formed in the roughed surface of the aluminum foil. Further, the aluminum foil can hardly be bonded to the nickel plated layer securely.

Solid electrolytic capacitors connected to CPUs of personal computers are demanded to have not only a large capacitance and a low ESR, but also a lower equivalent series inductance (ESL) even at high frequencies in order to obtain excellent noise reduction and transient response.

FIG. 23 is a perspective view of further conventional solid electrolytic capacitor 501 disclosed in Patent Document 3. FIG. 24 is a plan view of capacitor element 211 of capacitor 501. Capacitor element 211 includes an anode body made of aluminum foil, which is valve metal, a dielectric oxide layer on a surface of the anode body, insulating resist 212 for separating the surface of the anode body into anode electrode section 213 and a cathode forming section, and cathode electrode section 214 on the dielectric oxide layer at the cathode forming section. The surface of the anode body is roughened. Cathode electrode section 214 includes a solid electrolytic layer made of conductive polymer on the dielectric oxide layer at the cathode forming section, and a cathode layer on the solid electrolytic layer. The cathode layer includes a carbon layer formed on the solid electrolytic layer and a silver paste layer formed on the carbon layer. Anode electrode section 213 and cathode electrode section 214 are arranged along a longitudinal direction of capacitor element 211 while resist 212 is placed between sections 213 and 214.

Plural capacitor elements 211 are stacked on anode common terminal 215 connected to anode electrode sections 213 of capacitor elements 211. Anode electrode sections 213 of capacitor elements 211 are jointed to anode common terminal 215 by laser welding.

Cathode common terminal 216 is coupled to cathode electrode sections 214 of plural capacitor elements 211. Bend 216A is formed by bending both side ends of terminal 216 upward. Cathode common terminal 216 is bonded and connected electrically to cathode electrode sections 214 of plural capacitor elements 211 with conductive adhesive. Bends 216A are bonded and connected electrically to cathode electrode sections 214 with conductive adhesive 217.

Insulating resin package 218 covers plural capacitor elements 211 to expose respective portions of anode common terminal 215 and cathode common terminal 216 from the package. The portions exposed from resin package 218 are bent downward along resin package 218, thus constituting an anode terminal and a cathode terminal on a lower surface of resin package 218.

Bends 216A of cathode common terminal 216 are bonded to cathode electrode sections 214 of capacitor elements 211 with conductive adhesive 217 in solid electrolytic capacitor 501. This structure reduces an overall resistance of capacitor elements 211 stacked together, thus reducing the ESR of capacitor 501.

The surface of the anode body made of aluminum foil is roughened by an etching process to increase the surface area of the anode body for providing the capacitor with a large capacitance. However, technical matters of the etching process and the mechanical strength of the aluminum foil restrict the increase of the surface area of the anode body, hence preventing capacitor 501 from having a large greater capacitance.

The carbon layer or the silver paste layer constituting the cathode layer tends to have a thickness with variations, and can increase the overall resistance of the cathode layer or a contact resistance between the solid electrolytic layer and the carbon layer or between the carbon layer and the silver paste layer. As the number of capacitor elements 211 increases, the amounts of expensive materials, such as the silver paste and the conductive adhesive, accordingly making capacitor 501 expensive.

Patent Document 1: JP04-7086A
Patent Document 2: JP3439064B
Patent Document 3: JP2003-45753A

SUMMARY OF INVENTION

A solid electrolytic capacitor includes an anode foil, a solid electrolyte provided on the anode foil and made of conductive polymer, and a cathode foil provided on the solid electrolyte and facing the anode foil across the solid electrolyte. The anode foil includes an anode base made of aluminum, a rough surface layer made of aluminum and provided on a surface of the anode base, and a dielectric oxide layer provided on the rough surface layer and contacting the solid electrolyte. The cathode foil includes a cathode base made of aluminum, and a nickel layer provided on a surface of the cathode base and contacting the solid electrolyte. The nickel layer faces the dielectric oxide layer of the anode foil across the solid electrolyte. The nickel layer is made of nickel and nickel oxide.

This solid electrolytic capacitor has a large capacitance and a low equivalent series resistance while being inexpensive and highly reliable.

REFERENCE NUMERALS

101 Anode Foil
101A Anode Base
101B Rough Surface Layer (First Rough Surface Layer)
101C Dielectric Oxide Layer (First Dielectric Oxide Layer)
102 Cathode Foil
102A Cathode Base
103 Separator
104 Capacitor Element
104A Capacitor Element
105 Solid Electrolyte
102B Nickel Layer
108 Case
109 Sealing Member
201 Anode Foil
201A Anode Base
201B Rough Surface Layer (First Rough Surface Layer)
201C Dielectric Oxide Layer (First Dielectric Oxide Layer)
202 Cathode Foil
202A Cathode Base
202B Nickel Layer
203 Separator
205 Solid Electrolyte
209A Cathode Base
603 Fine Particle
605 Tree Structure
701B Rough Surface Layer (Second Rough Surface Layer)
701C Dielectric Oxide Layer (Second Dielectric Oxide Layer)
803 Fine Particle
805 Tree Structure
3110A Pore
3209A Pore

DESCRIPTION OF PREFERRED EMBODIMENTS

Exemplary Embodiment 1

Figure 1:
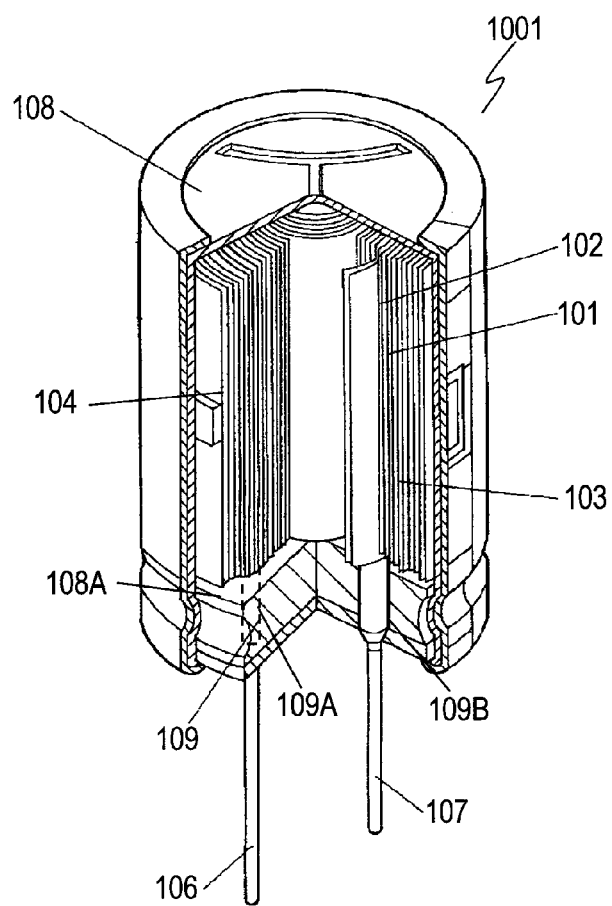
FIG. 1 is a perspective view of a solid electrolytic capacitor in accordance with Exemplary Embodiment 1 of the present invention.

FIG. 1 is a perspective view of solid electrolytic capacitor 1001 in accordance with Exemplary Embodiment 1 of the present invention. Capacitor 1001 includes capacitor element 104, case 108 for accommodating capacitor element 104 therein, anode terminal 106 coupled to capacitor element 104, cathode terminal 107 coupled to capacitor element 104, and sealing member 109 for sealing opening 108A of case 108. Sealing member 109 is made of resin-vulcanized butyl rubber, and has hole 109A and hole 109B through which anode terminal 106 and cathode terminal 107 extend, respectively. Capacitor element 104 includes anode foil 101, cathode foil 102, and separator 103 which are stacked and wound together. Anode terminal 106 and cathode terminal 107 are coupled to anode foil 101 and cathode foil 102, respectively.

Figure 2:
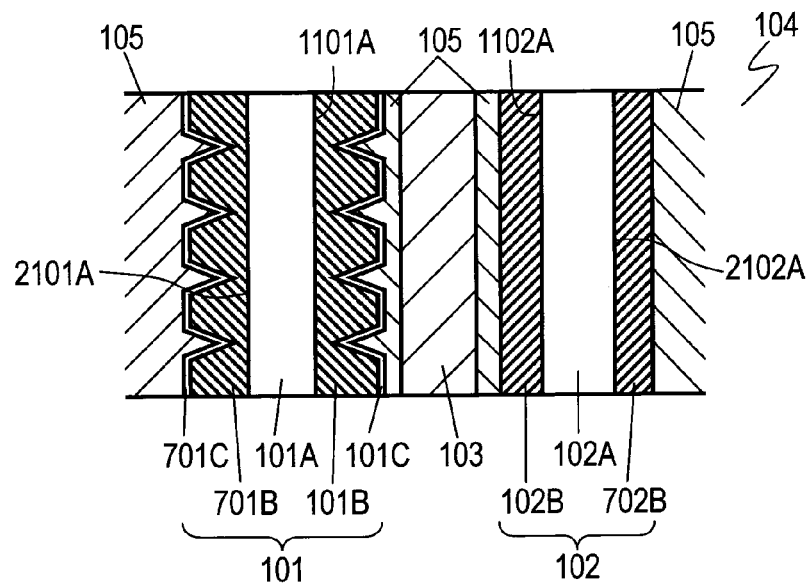
FIG. 2 is a schematic cross-sectional view of a capacitor element of the solid electrolytic capacitor in accordance with Embodiment 1.

FIG. 2 is a schematic cross-sectional view of capacitor element 104. Anode foil 101 includes anode base 101A made of highly-pure aluminum, rough surface layer 101B provided on surface 1101A of anode base 101A, and dielectric oxide layer 101C provided on rough surface layer 101B. Rough surface layer 101B is formed by evaporating and depositing aluminum on surface 1101A of anode base 101A. Anode base 101A has a thickness of 50 μm. Rough surface layer 101B is anodized to form dielectric oxide layer 101C. Cathode foil 102 includes cathode base 102A made of aluminum and nickel layer 102B provided on surface 1102A of cathode base 102A. Nickel layer 102B is formed by evaporating and depositing nickel and nickel oxide on surface 1102A of cathode base 102A.

Separator 103 is made of electrolyte-soaked paper mainly made of cellulose fiber. Anode foil 101 and cathode foil 102 are wound together with separator 103 while separator 103 is placed between foils 101 and 102, thereby providing capacitor element 104. Then, capacitor element 104 is heated to heat and carbonize separator 103. Solid electrolyte 105 is made of conductive polymer and is impregnated into separator 103. Anode terminal 106 is coupled to anode base 101A of anode foil 101. Cathode terminal 107 is coupled to cathode base 102A of cathode foil 102. Cathode foil 102 is provided on solid electrolyte 105, and faces anode foil 101 across electrolyte 105. Dielectric oxide layer 101C is provided on rough surface layer 101B and contacts solid electrolyte 105. Nickel layer 102B is provided on surface 1102A of cathode base 102A and contacts electrolyte 105. Nickel layer 102B faces dielectric oxide layer 101C of anode foil 101 across electrolyte 105.

Capacitor element 104 of solid electrolytic capacitor 1001 in accordance with Embodiment 1 includes rough surface layer 101B provided on surface 1101A of anode base 101A, dielectric oxide layer 101C provided on rough surface layer 101B, and nickel layer 102B provided on surface 1102A of cathode base 102A. In capacitor element 104, rough surface layer 701B similar to rough surface layer 101B is provided on surface 2101A of anode base 101A opposite to surface 1101A. Dielectric oxide layer 701C similar to dielectric oxide layer 101C is provided on rough surface layer 701B. Nickel layer 702B similar to nickel layer 102B is provided on surface 2102B of cathode base 102A opposite to surface 1102A.

Solid electrolyte 105 is made of polyethylenedioxy thiophene, chemically-polymerized conductive polymer, and can be formed by the following method. Capacitor element 104 is dipped into polymer solution containing 1 part of weight of heterocyclic monomer, 2 parts by weight of oxidizer, and 4 parts by weight of polymerization solvent, and then, is taken out of the polymer solution. Then, capacitor element 104 is stored at a temperature of 85° C. for 60 minutes so as to impregnate separator 103 with solid electrolyte 105. According to Embodiment 1, the heterocyclic monomer is ethylenedioxy thiophene. The oxidizer is p-toluenesulfonic acid ferric iron. The polymerization solvent is n-butanol. Solid electrolyte 105 can be made of another conductive polymer by another method.

Figure 3:
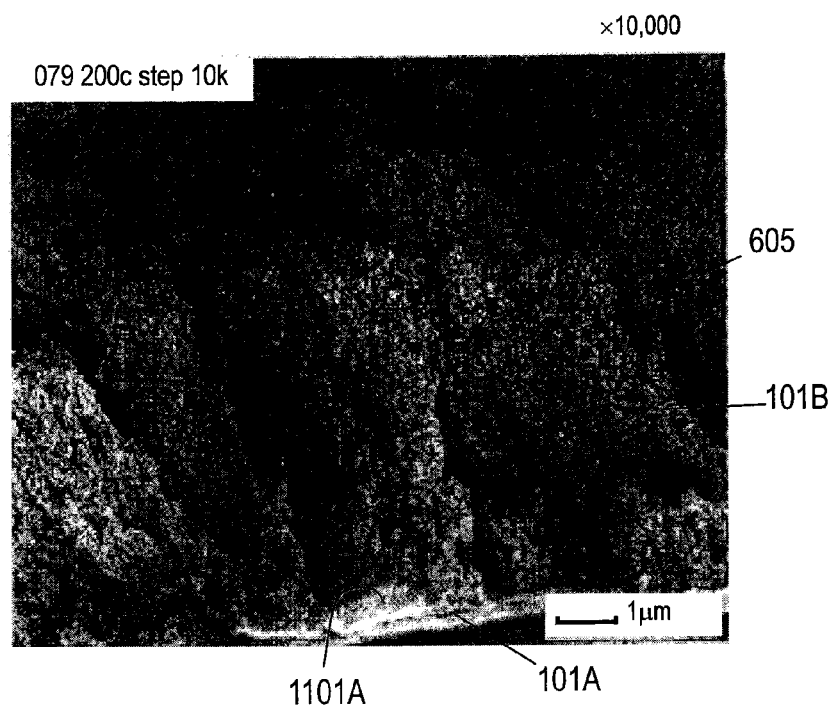
FIG. 3 is an enlarged view of an anode foil of the solid electrolytic capacitor in accordance with Embodiment 1.
Figure 4A:
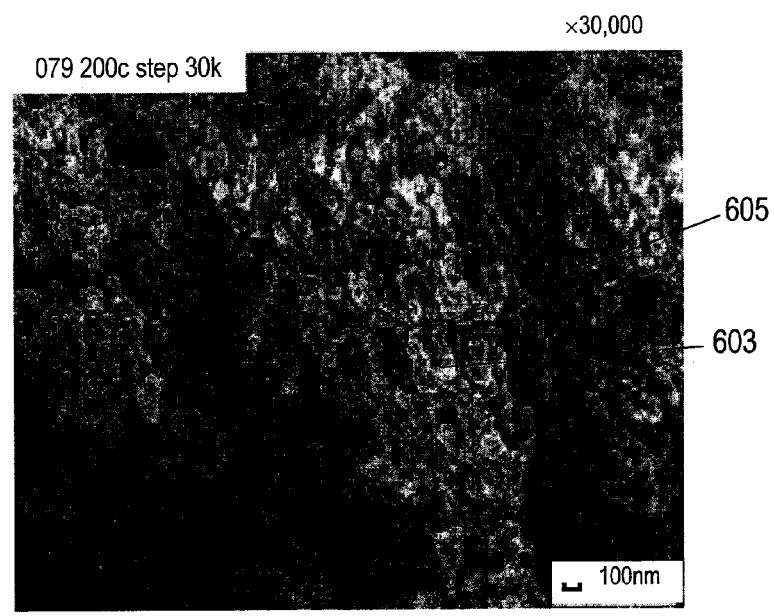
FIG. 4A is an enlarged view of the anode foil shown in FIG. 3.

FIGS. 3 and 4A are enlarged views of anode foil 101, microscopic photographs captured with scanning electron microscopes (SEM) and having magnifying powers of ten thousand and thirty thousand, respectively. As shown in FIGS. 3 and 4A, rough surface layer 101B is formed of plural tree structures 605 clustered together and extending from surface 1101A of anode base 101A. Each tree structure 605 branches into plural twigs, and is formed of plural fine particles 603 coupled to each other and linking to have a shape of a caulerpa lentillifera.

Figure 4B:
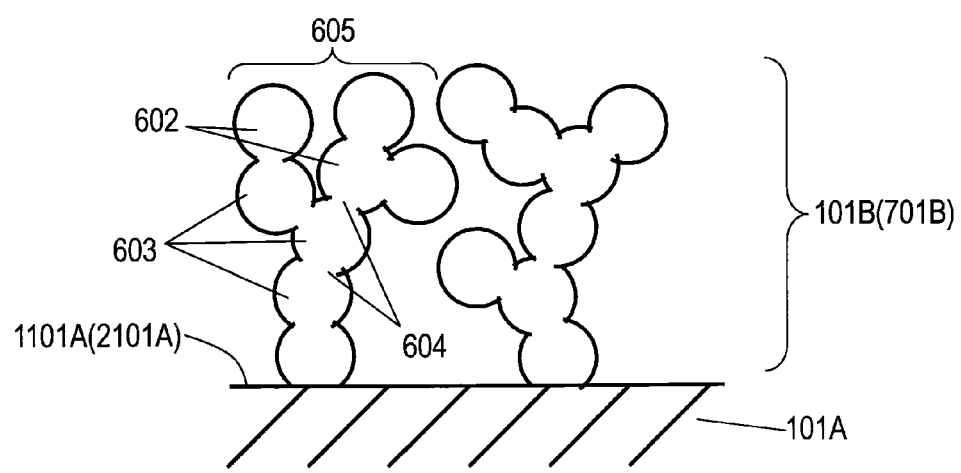
FIG. 4B is a schematic view of the anode foil shown in FIG. 4A.

FIG. 4B is a schematic view of anode foil 101. Rough surface layer 101B is formed of plural tree structures 605 clustered together and extending from surface 1101A of anode base 101A. Each tree structure 605 branches into plural twigs, and is formed of plural fine particles 603 coupled to each other and linking to have a shape of a caulerpa lentillifera.

Anode foil 101 shown in FIGS. 3, 4A and 4B can be manufactured by the following method. Anode base 101A is put into an evaporating oven having vacuum atmosphere. Argon gas and oxygen gas are put into the oven, thereby evaporating and depositing fine particles 603 of aluminum onto surface 1101A of anode base 101A, thereby forming rough surface layer 101B.

Figure 5:
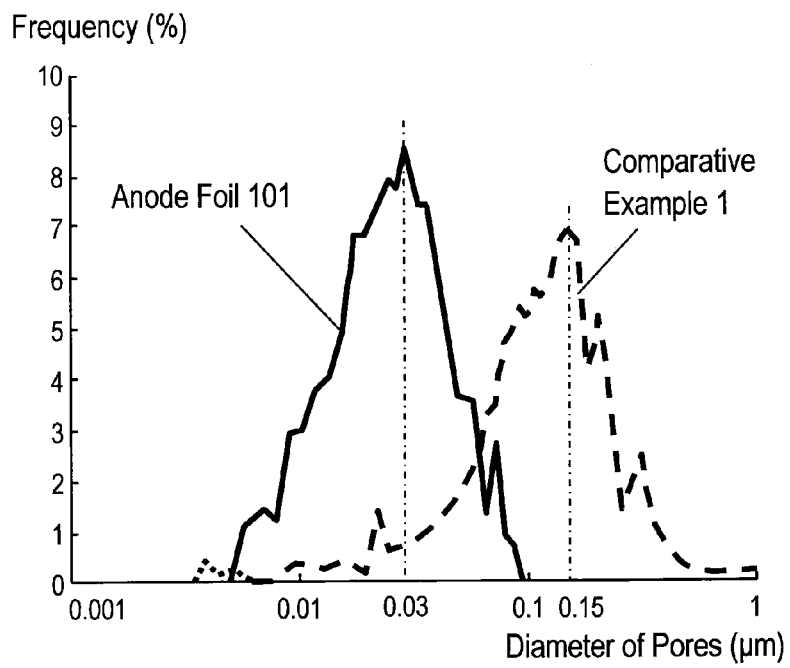
FIG. 5 shows a distribution of diameters of pores in the anode foil in accordance with Embodiment 1.

FIG. 5 shows a distribution of diameters of pores in rough surface layer 101B of anode foil 101 and a distribution of diameters of pores in a rough surface layer of Comparative Example 1 of an anode foil which is etched. The mode value of the diameters of the pores in anode foil 101 is about 0.03 μm, which is extremely smaller than the mode of Comparative Example 1 of about 0.15 μm. The surface area of anode foil 101 can be increased more than Comparative Example 1. Rough surface 101B is formed of tree structures 605 extending from anode base 101A, and can be impregnated with a larger amount of polymer solution than Comparative Example 1.

Tree structure 605 is branched into twigs 602 formed of fine particles 603 linked to have a shape of a caulerpa lentillifera. This structure increases the bonding strength between fine particles 603, thus prevents necks 604 partially thin between particles 603 from breaking. Thus, necks 604 do not break when rough surface layer 101B of anode foil 101 is anodized to form dielectric oxide layer 101C. This structure thus not only increases the mechanical strength but also reduces the decreasing of the capacitance, accordingly allowing roll-type capacitor element 104 to be readily manufactured.

Next, characteristics of anode foil 101 will be described in detail below.

Samples of anode foil 101 in accordance with Embodiment 1 were prepared. These samples are different in a mode value of diameters of pores and a thickness of rough surface layer 101B. Other samples of anode foil of Comparison Example 1 different in a thickness of the rough surface layer formed by etching were prepared. Each of the samples had an area of 10 cm$^2$. These samples were put into water solution containing 7% of ammonium adipate at a temperature of 70° C. for 20 minutes to anodize the samples under the condition of an anodizing voltage of 20V and a current density of 0.05 A/cm$^2$, thereby forming a dielectric oxide layer on the rough surface layer of each sample. Then, the samples were put into water solution containing 8% of ammonium borate at a temperature of 30° C. together with a reference electrode, and then were measured in the capacitance between the anode foil of each sample and the reference electrode at a frequency of 120 Hz with an impedance analyzer. The capacitance was measured as an anodization capacitance which is a characteristic particular to the anode foil of each sample. The condition for the anodizing and the measuring condition are not limited to the above conditions.

Figure 6:
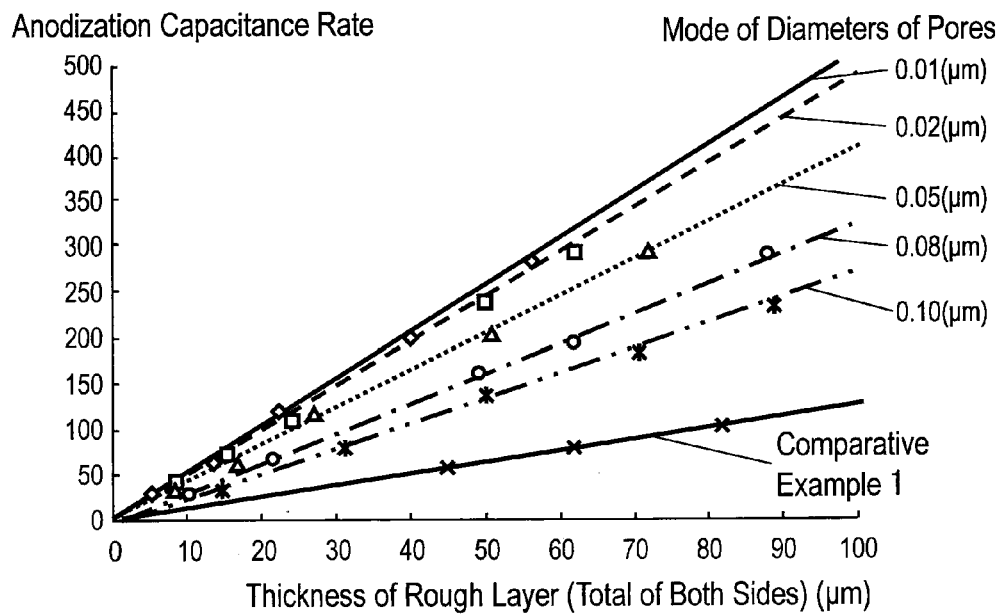
FIG. 6 shows characteristics of the anode foil in accordance with Embodiment 1.

FIG. 6 shows relations between the thickness (of total of both sides) of the rough surface layer of the anode foil having pores having various modes of diameters and an anodization capacitance rate. The anodization capacitance rate is defined to be a rate of an anodization capacitance of the samples to that of Comparative Example 1 including the rough surface layer of the anode foil having a thickness (of total of both sides) of 80 μm, assuming that the anodization capacitance of Comparative Example 1 is 100.

As shown in FIG. 6, the anodization capacitance rate increases proportionately to the thickness of the rough surface layer, and increases as the mode of the diameters of the pores decreases. The anodization capacitance of the sample of anode foil 101 according to Embodiment 1 is larger than that of Comparison Example 1 having the same thickness of the rough surface layer as that of the sample according to Embodiment 1. Anode foil 101 according to Embodiment 1 thus can have a smaller thickness and a larger capacitance than the foil roughened by an etching method. This advantage becomes more effective as the diameters of the pores become smaller since the smaller diameters of void pores produce the large surface area.

Next, separators 103 are provided onto dielectric oxide layer 101C anode foil 101 in accordance with Embodiment 1 and onto dielectric oxide layer 101C of the anode foil of comparative Example 1. Cathode foils 102 are provided on the separators 103. Then, anode foil 101, separator 103, and cathode foil 102 are wound together and put into polymer solution to produce capacitor element 104. Then, a capacitance between anode foil 101 and cathode foil 102 are measured as a product capacitance. Then, a product capacitance rate is calculated. The product capacitance rate is defined to be a rate of the product capacitance of capacitor element 104 to that of Comparative Example 1 including the anode foil having a thickness (total of both sides) of 80 μm, assuming that the product capacitance of Comparative Example 1 is 100.

Figure 7:
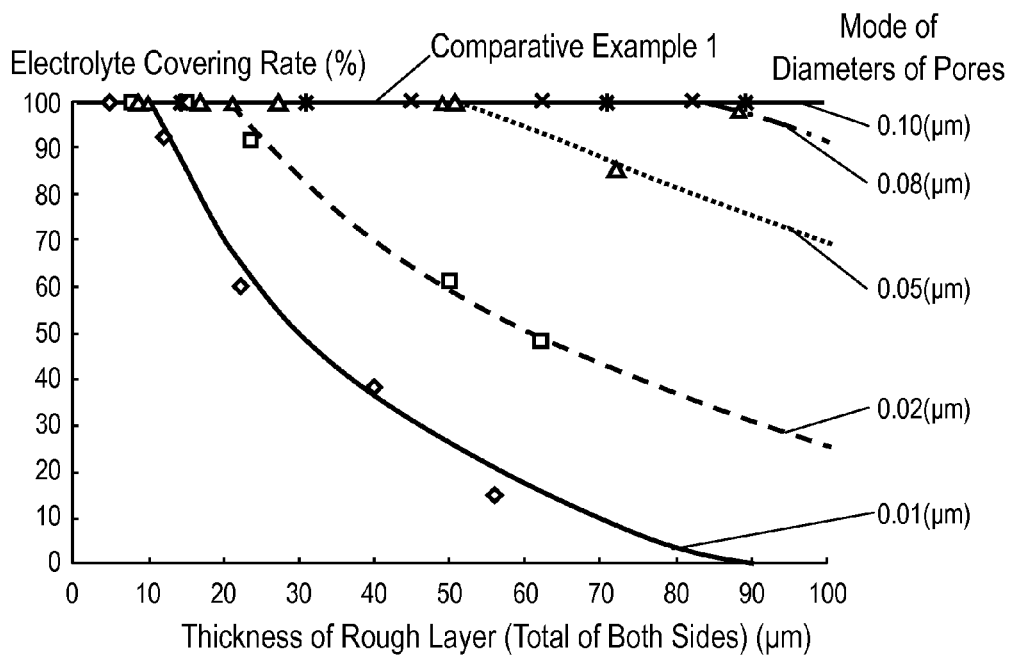
FIG. 7 shows characteristics of the anode foil in accordance with Embodiment 1.

FIG. 7 shows relations between the thickness (total of both sides) of rough surface layer 101B of anode foil 101 having various modes of the diameters of pores and an electrolyte covering rate (%). The electrolyte covering rate (%) is calculated by dividing the product capacitance rate by the anodization capacitance rate and multiplying the quotient by 100.

As shown in FIG. 7, the electrolyte covering rate decreases as the mode of the diameters of the pores decreases, and decreases as the thickness of rough surface layer 101B decreases. This is because a smaller mode of the diameters of the pores prevents the monomer of solid electrolyte 105 from impregnating into the pores, and yet, a large thickness of rough surface layer 101B further facilitates to prevent the monomer from impregnating into surface layer 101B.

Figure 8:
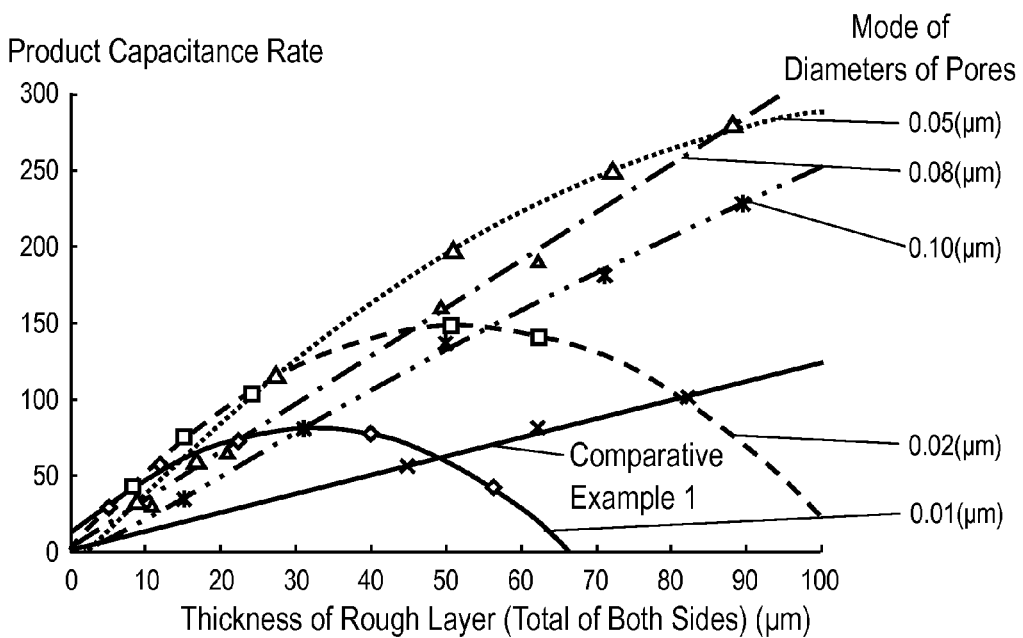
FIG. 8 shows characteristics of the solid electrolytic capacitor in accordance with Embodiment 1.

FIG. 8 shows the relation among the diameters of the pores, the thickness of the rough surface layer, and the product capacitance. This relation is determined by the relation among the diameters of the pores, the thickness of rough surface layer 101B and the anodization capacitance rate shown in FIG. 6 and by the relation among the diameters of the pores, the thickness of rough surface layer 101B and the electrolyte covering rate shown in FIG. 7. The sample having the largest anodization capacitance rate and the mode of 0.01 μm shown in FIG. 6 has a small electrolyte covering rate, as shown in FIG. 7. Those samples thus have the product capacitance rates do not exceed 100, as shown in FIG. 8. In other words, anode foil 101 having the mode of 0.01 μm cannot produce a larger capacitance than the electrolytic capacitor including the anode foil of Comparative Example 1.

Samples, out of the samples having the mode of the diameters of the pores of 0.02 μm, having the thickness of rough surface layer 101B ranging from 20 μm to 80 μm have product capacitance rates larger than 100. However, some of the samples, out of the samples having the mode of the diameters of the pores of 0.02 μm, having small thicknesses of rough surface layers do not necessarily have product capacitance rates larger than 100.

Even if having a product capacitance rate not exceeding 100, the samples have a capacitance per thickness of rough surface layer 101B exceeds that of the anode foil roughened by the etching method. Therefore, anode foil 101 having a thin rough surface layer 101B can provide a capacitor having a capacitance as large as the capacitor including the anode foil of Comparative Example 1 roughened by the etching method. A larger mode of diameters of the pores increases the electrolyte covering rate, providing a reliable electrolytic capacitance.

That is, in the case that the rough surface layer of the anode foil of Comparative Example 1 roughened by the etching method has a thickness (total of both sides) of 80 μm, an anode base, i.e. parts of the anode foil other than the rough surface layer needs a thickness not less than 25 μm in order to maintain the mechanical strength. The thickness of the anode foil of Comparative Example 1 thus is 105 μm. In anode foil 101 in accordance with Embodiment 1, the thickness of the rough surface layer (total of both sides) is 20 μm, so that the total thickness of anode foil 101 is 45 μm (=20 μm+25 μm). Anode foil 101 provides a capacitance which is provided by the anode foil of Comparative Example 1 having the thickness of 80 μm. Since thicker anode base 101A reduces an equivalent series resistance (ESR), the thicknesses of both of rough surface layer 101B and anode base 101A can be designed based on a desirable capacitance and ESR so that a greater margin for the design can be obtained.

As discussed above, the mode of the diameters of the pores of anode foil 101 in accordance with Embodiment 1 ranges from 0.02 μm to 0.10 μm, and the thickness (total of both sides) of the rough surface layer ranges from 20 μm to 80 μm. The product capacitance rate of anode foil 101 sufficiently exceeds 100. In other words, solid electrolytic capacitor 1001 including anode foil 101 is thinner and has a larger capacitance than Comparative Example 1 including the anode foil which is roughened by the etching method and which has a thickness of 80 μm.

Nickel layer 102B containing nickel and nickel oxide can be formed on surface 1102A of cathode base 102A having a thickness of 50 μm and made of highly-pure aluminum foil by evaporating fine particles of nickel onto surface 1102A in vacuum atmosphere. Nickel layer 102B can be formed by a dry process method, such as a sputtering method or a CVD method, other than the above method. Thinner cathode base 102A reduces the size of solid electrolytic capacitor 1001. Thicker cathode base 102A reduces the ESR of capacitor 1001.

Figures 9, 11:
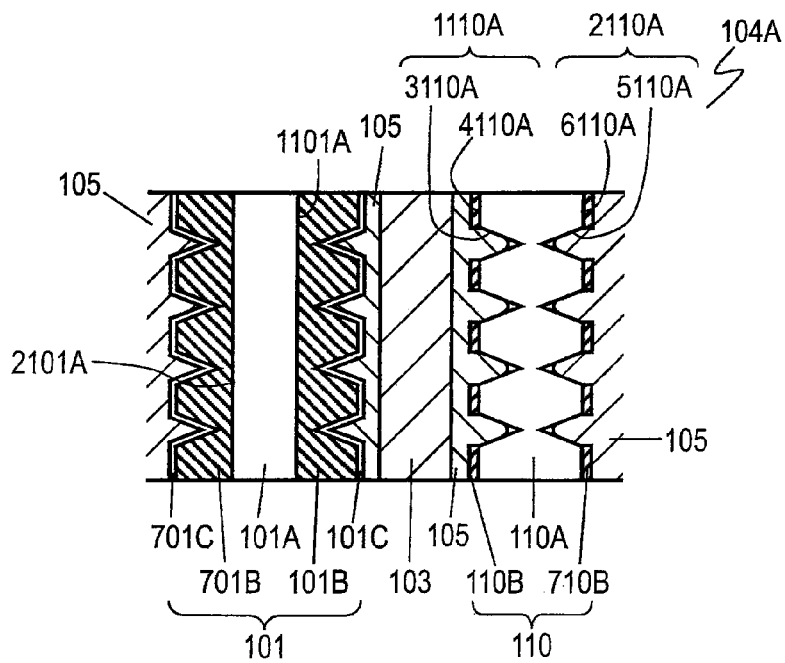
FIG. 9 shows a capacitance and an equivalent series resistance of the solid electrolytic capacitor in accordance with Embodiment 1.
FIG. 11 is a schematic cross-sectional view of a capacitor element of a solid electrolytic capacitor in accordance with exemplary Embodiment 3 of the invention.

FIG. 9 shows measurement results of capacitance and ESR of solid electrolytic capacitor 1001 in accordance with Embodiment 1 and Comparison Example 1. The cathode foil of Comparison Example 1 does not include a nickel layer containing nickel and nickel oxide.

As shown in FIG. 9, capacitor 1001 has a capacitance 3.9 times the capacitance of Comparison Example 1, and has half the ESR of Comparative Example 1, thus capacitor 1001 in accordance with Embodiment 1 has excellent performance. Since solid electrolytic capacitor 1001 includes cathode foil 102 having nickel layer 102B made of nickel and nickel oxide on the surface of foil 102, no capacitance is produced at cathode foil 102. The capacitance produced at anode foil 101 of capacitor element 104 is not connected in series with any capacitance, so that capacitor 1001 can have a large capacitance.

The nickel oxide contained in nickel layer 102B is semiconductor and has electrical conductivity, so that this nickel oxide reduces the ESR of capacitor 1001. The nickel oxide is not affected by the heat for carbonizing separator 103 or by the oxidation due to the heat in the reflow process, hence not increasing the ESR. The nickel oxide on the surface of nickel layer 102B protects nickel layer 102B from corrosion, so that nickel layer 102B and solid electrolyte 105 can bond together with large strength.

Heat is generated when nickel layer 102B is evaporated on cathode base 102A. The heat forms alloy of nickel contained in nickel layer 102B and aluminum contained in cathode base 102A, so that nickel layer 102B and cathode base 102A can be bonded together with large strength. Since nickel layer 102B is evaporated on cathode base 102A, nickel layer 102B can be thin easily, hence providing solid electrolytic capacitor 1001 inexpensively with a large capacitance and a small ESR.

According to Embodiment 1, nickel layer 102B has a thickness of 0.1 μm; however, this layer can be thinner or thicker. Since the thicker layer raises the cost, the thickness is preferably not larger than 0.5 μm. Nickel layer 102B having a thickness of 0.1 μm provides the effects. The nickel layer can hardly be thin by a non-electrolytic plating method.

The nickel layer formed by the plating method has a thickness of 1 μm. The non-electrolytic plating method cannot bond the nickel layer to cathode base 102A with large strength due to an aluminum oxide film existing on the surface of cathode base 102A.

Figure 10:
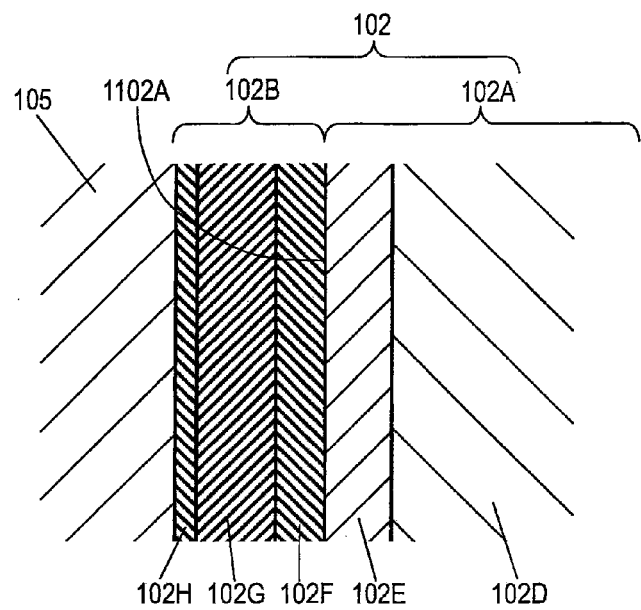
FIG. 10 is an enlarged view of a cathode foil of the solid electrolytic capacitor in accordance with Embodiment 1.

FIG. 10 is an enlarged cross-sectional view of cathode foil 102. Cathode base 102A made of aluminum foil includes base foil 102D made of aluminum foil, and base oxide layer 102E provided on base foil 102D. The oxide layer is formed on surface 1102A of cathode base 102A. The aluminum of base foil 102D is oxidized naturally to become an oxide layer. Nickel layer 102B is made of nickel and nickel oxide (Ni—O), and includes core layer 102G made of nickel, nickel oxide layer 102H made of nickel oxide, and diffusion layer 102F provided between core layer 102G and base oxide layer 102E. Nickel oxide layer 102H is made of nickel, aluminum, and oxygen, and contacts core layer 102G and solid electrolyte 105. Diffusion layer 102F is provided on surface 1102A of cathode base 102A, that is, on base oxide layer 102E, and contacts core layer 102G.

Cathode foil 102 can be manufactured by the following evaporating method. A highly-pure aluminum foil having a thickness of 50 μm is used as cathode base 102A. Base oxide layer 102E is formed on base foil 102D by natural oxidation. Fine particles of nickel are evaporated onto surface 1102A of cathode base 102A, i.e. on base oxide layer 102E, in a vacuum atmosphere by adjusting the concentration of oxygen. This evaporation forms nickel layer 102B including diffusion layer 102F formed on surface 1102A of cathode base 102A, i.e., on base oxide layer 102E, core layer 102G formed on diffusion layer 102F made of nickel, and nickel oxide layer 102H formed on core layer 102G and made of nickel oxide (Ni—O). According to Embodiment 1, nickel layer 102B has a thickness of 0.1 μm, and nickel oxide layer 102H has a thickness about 1/10 thick the thickness of nickel layer 102B.

Nickel layer 102B can be formed by a dry process method, such as a sputtering method or a CVD method, other than the above method, providing the same effects. Thinner base foil 102D reduces the size and ESR of capacitor element 104.

Nickel oxide layer 102H protects cathode foil 102 from corrosion, so that cathode foil 102 and solid electrolyte 105 can bond together with large strength.

Diffusion layer 102F is made of aluminum contained in base foil 102A and nickel melted and coupled with oxygen due to heat generated during the forming of nickel layer 102B by evaporation. Diffusion layer 102F bonds nickel layer 102B to cathode base 102A with large strength, and allows nickel layer 102B to be thin easily. Thus, solid electrolytic capacitor 1001 with a large capacitance and a small ESR is provided with a structure at a lower cost.

According to Embodiment 1, separator 103 made of carbonized electrolytic paper mainly made of cellulose fiber. Separator 103 can be processed by a reinforcement process in which poly-acrylic amid or its derivative is added to the cellulose fiber, or by a hydrophobic surface treatment by using silane coupling agent. One of these processes prevents separator 103 from being carbonized even at a high temperature of 300° C., thereby providing solid electrolytic capacitor 1001 with desired characteristics.

Separator 103 can be made mainly of chemical fiber. Solid electrolyte 105 can be unevenly distributed in the cellulose fiber; however, can be evenly impregnated in the chemical fiber, accordingly reducing the impedance at high frequencies. The chemical fiber can be made of polyethylene terephthalate, acryl, nylon, polyvinyl alcohol or their derivatives since they are stable against polymer solution used for forming solid electrolyte 105 and have large heat resistance. Mixed fiber of the polyethylene terephthalate and its derivative and mixed fiber of polyethylene terephthalate and polyvinyl alcohol can be mixed easily with polyethylenedioxy thiophene contained in solid electrolyte 105, so that those mixed fiber can closely and strongly bond separator 103 to solid electrolyte 105. Separator 103 made of those mixed fiber allows solid electrolytic capacitor 1001 to have a smaller impedance than separator 103 formed of carbonized electrolytic paper mainly made of cellulose fiber by more than 10% at high frequencies.

Capacitor element 104 of solid electrolytic capacitor 1001 in accordance with Embodiment 1 is heated to carbonize separator 103. However, separator 103 can is heated to be carbonized, and then, is rolled with anode foil 101 and cathode foil 102, thereby forming capacitor element 104.

Anode terminal 106 and cathode terminal 107 connected to anode foil 101 and cathode foil 102 extend along a base board made of resin and bent, thereby providing a surface-mounting type solid electrolytic capacitor.

Exemplary Embodiment 2

A solid electrolytic capacitor in accordance with Exemplary Embodiment 2 includes nickel layer 102B made of nickel and nickel oxide provided only on surface 1102A of cathode base 102A of cathode foil 102 shown in FIG. 2. Any nickel layer is not formed on another surface 2102A of cathode base 102A. Surface 2102A contacts solid electrolyte 105. FIG. 9 shows measurement results of a capacitance and an equivalent series resistance (ESR) of the solid electrolytic capacitor in accordance with Embodiment 2 similarly to the capacitor according to Embodiment 1, As shown in FIG. 9, the capacitor according to Embodiment 2 has a capacitance about 3.8 times the capacitance of Comparative Example 1, and has an ESR about ¾ the ESR of Comparative Example 1. The capacitor in accordance with Embodiment 2 thus has excellent performance. Nickel layer 102B formed only on surface 1102A of cathode base 102A foes not produce a capacitance at surface 2102A.

However, nickel layer 102B is formed on surface 1102A of cathode base 102A but not on surface 2102A, hence providing this capacitor with an ESR larger than that of the capacitor in accordance with Embodiment 1.

Exemplary Embodiment 3

FIG. 11 is a schematic cross-sectional view of capacitor element 104A included in a solid electrolytic capacitor in accordance with Exemplary Embodiment 3 of the present invention. In FIG. 11, components identical to those of capacitor 104 shown in Fig. are denoted by the same reference numerals, and their description is omitted. Capacitor element 104A includes cathode foil 110 instead of cathode foil 102 of capacitor element 104 shown in FIG. 2. Cathode foil 110 includes cathode base 110A made of aluminum foil and nickel layer 110B formed on surface 1110A of cathode base 110A and made of nickel and nickel oxide. Surface 1110A of cathode base 110A is roughened by an etching process, and has a large number of pores 3110A formed thereon. Nickel layer 110B is provided to portion 4110A of surface 1110A where no pore is formed, so that no nickel layer is provided inside pores 3110A. Solid electrolyte 105 contacts pores 3110A of cathode base 110A.

In capacitor element 104A in accordance with Embodiment 3, rough surface layer 701B, similar to rough surface layer 101B of anode base 101A, is provided on surface 2101A opposite to surface 1101A. Dielectric oxide layer 701C, similar to dielectric oxide layer 101C, is provided on rough surface layer 701B. Nickel layer 710B, similar to nickel layer 110B, is provided on surface 2110A of cathode base 110A opposite to surface 1110A. Surface 2110A is roughened by an etching process, and has a large number of pores 5110A provided therein. Nickel layer 710B is provided on portion 6110A of surface 2110A where no pore 5110A is formed therein, so that no nickel layer is provided inside pores 5110A. Solid electrolyte 105 contacts pores 5110A of cathode base 110A.

Cathode foil 110 has a structure similar to that of cathode foil 102 in accordance with Embodiment 1 shown in FIG. 10. A highly-pure aluminum foil having a thickness of 50 µm is used as cathode base 110A. Surfaces 1110A and 2110A of cathode base 110A are roughened by the etching process, thereby forming numerous pores 3110A and 5110A in the surfaces, respectively. Then, nickel layers 110B and 710B are formed on portions 4110A and 6110A of surfaces 1110A and 2110A. Nickel layers 110B and 710B have structures similar to the structure of nickel layer 102 shown in FIG. 10, and are formed similarly to nickel layer 102. According to Embodiment 3, nickel layers 110B and 710B have a thickness of 0.1 µm.

FIG. 9 shows measurement results of a capacitance and an equivalent series resistance (ESR) of the solid electrolytic capacitor in accordance with Embodiment 3. This capacitor has a capacitance about 4.0 times the capacitance of Comparative Example 1 and has an ESR about ⅔ the ESR of Comparative Example 1. The capacitor according to Embodiment 3 thus has an excellent performance. The roughening process enlarges the area of surface 1110A of cathode foil 110, accordingly reducing the ESR.

The nickel layer formed by a non-electrolytic plating method can hardly be thin, and the nickel layer formed by the plating method has a thickness of This thickness can cause pores 3110A formed on surface 1110A of cathode base 110A roughened by the etching process to be buried into the nickel layer. An aluminum oxide layer formed on the surface of cathode base 110A prevents the nickel layer from being bonded to cathode base 110A with large strength.

Exemplary Embodiment 4

A solid electrolytic capacitor in accordance with Exemplary Embodiment 4 includes nickel layer 110B which is made of nickel and nickel oxide and which is formed on surface 1110A of cathode base 110A, as shown in FIG. 11. Any nickel layer is not provided on surface 2110A of cathode base 110A opposite to surface 1110A, and surface 2110A contacts solid electrolyte 105. FIG. 9 shows measurement results of a capacitance and an equivalent series resistance (ESR) of this solid electrolytic capacitor.

As shown in FIG. 9, the solid electrolytic capacitor in accordance with Embodiment 4 has a capacitance about 3.9 times the capacitance of Comparative Example 1, and has as ESR about ⅔ the ESR of Comparative Example 1. Thus, this capacitor has an excellent performance. Nickel layer 102B is formed only on surface 1110A of cathode base 110A, so that substantially no capacitance is produced on surface 2110A on which no nickel layer is formed.

However, since nickel layer 102B is formed on surface 1110A of cathode base 110A but not formed on surface 2110A, the ESR of this capacitor in accordance with Embodiment 4 is larger than that of the capacitor in accordance with Embodiment 3.

Exemplary Embodiment 5

Figure 12:
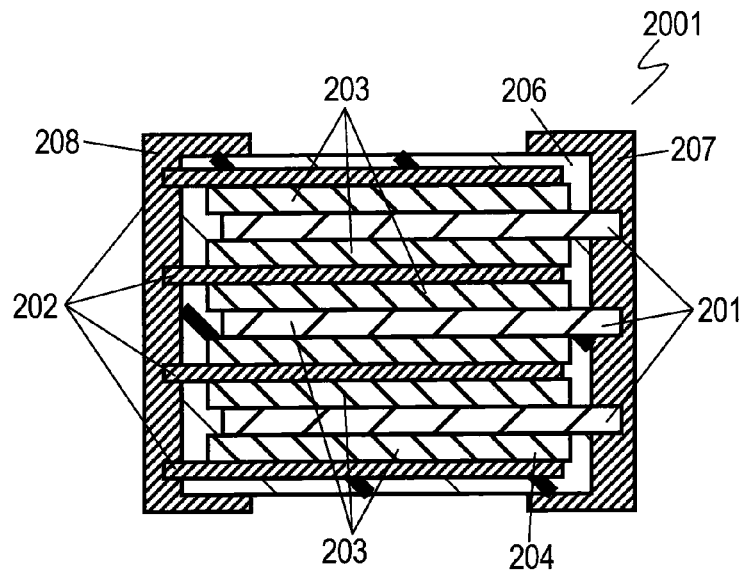
FIG. 12 is a cross-sectional view of a solid electrolytic capacitor in accordance with Exemplary Embodiment 5 of the invention.

FIG. 12 is a cross-sectional view of solid electrolytic capacitor 2001 in accordance with Exemplary Embodiment 5 of the present invention. Capacitor 2001 includes capacitor element 204, package 206 made of insulating resin and covering capacitor element 204 unitarily, anode terminal 207 coupled to capacitor element 204, and cathode terminal 208 coupled to capacitor element 204. Anode terminal 207 and cathode terminal 208 are exposed on side surface 206A and side surface 206B of package 206 opposite to each other, respectively. Capacitor element 204 includes anode foils 201, cathode foils 202, and separators 203 placed between anode foils 201 and cathode foils 202. Anode terminal 207 is coupled to anode foils 201. Cathode terminal 208 is coupled to cathode foils 202.

Figure 13:
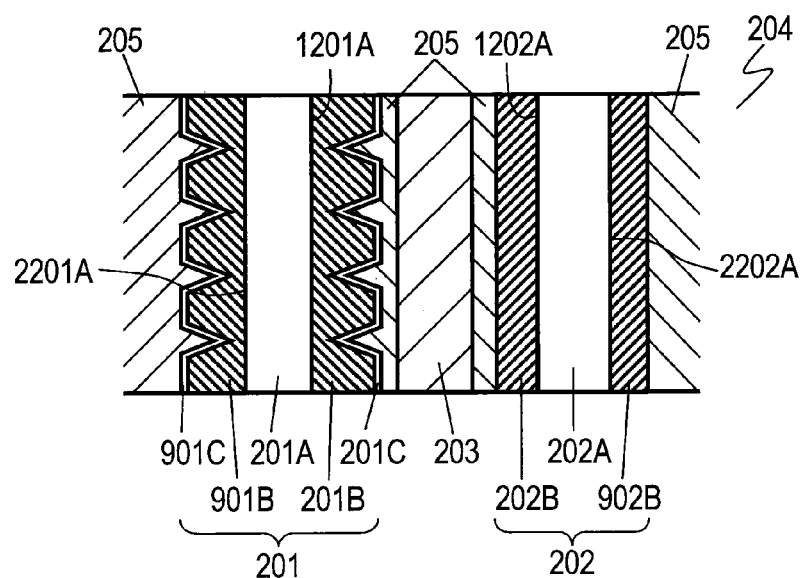
FIG. 13 is a schematic cross-sectional view of a capacitor element of the solid electrolytic capacitor in accordance with Embodiment 5.

FIG. 13 is a schematic cross-sectional view of capacitor element 204. Anode foil 201 includes anode base 201A made of aluminum foil, rough surface layer 201B provided on surface 1201A of anode base 201A, and dielectric oxide layer 201C provided on rough surface layer 201B. Rough surface layer 201B can be formed by evaporating aluminum onto surface 801A of anode base 201A. Dielectric oxide layer 201C can be formed by anodizing rough surface layer 201B. Cathode foil 202 includes cathode base 202A made of aluminum foil, and nickel layer 202B provided on surface 1202A of cathode base 202A. Nickel layer 202B is formed by evaporation and made of nickel and nickel oxide. Separator 203 is made of electrolytic paper. Anode foils 201 are deviated in a direction opposite to cathode foils 202. Separator 203 is placed between anode foil 201 and cathode foil 202 before they are stacked one after another to provide capacitor element 204. Then, capacitor element 204 is heated to carbonize separator 203 having solid electrolyte 205 made of high polymer impregnated therein. Cathode foil 202 is provided on solid electrolyte 205 and faces anode foil 201 across solid electrolyte 205. Dielectric oxide layer 201C is formed on rough surface layer 201B and contacts solid electrolyte 205. Nickel layer 202B is provided on surface 1202A of cathode base 202A, contacts solid electrolyte 205, and faces dielectric oxide layer 201C of anode foil 201 across solid electrolyte 205.

Solid electrolyte 205 is made of polyethylenedioxy thiophene, chemically-polymerized conductive polymer, and can be formed by the following method. Capacitor element 204 is immersed into polymer solution containing one part by weight of heterocyclic monomer, two parts by weight of oxidizer, and four parts by weight of polymerization solvent, and then, take out of the polymer solution. Capacitor element 204 is left at a temperature of 85° C. for 60 minutes to impregnate solid electrolyte 205 into separator 203. According to Embodiment 5, ethylenedioxy thiophene is used as the heterocyclic monomer, and p-toluenesulfonic acid ferric iron is used as the oxidizer, and n-butanol is used as the polymerization solvent. Solid electrolyte 205 can be made of another conductive polymer and formed by another method.

Figure 14:
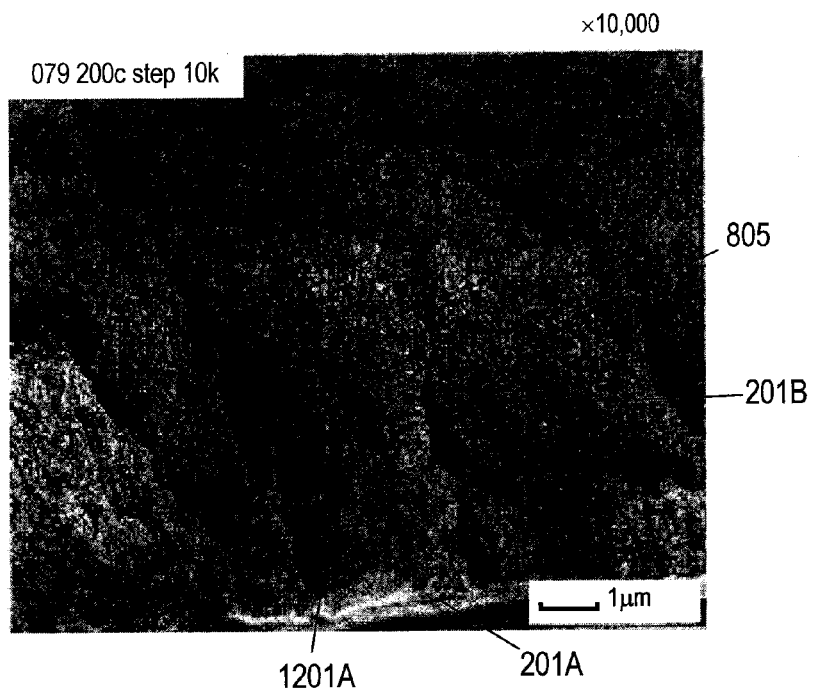
FIG. 14 is an enlarged view of an anode foil of the solid electrolytic capacitor in accordance with Embodiment 5.
Figure 15A:
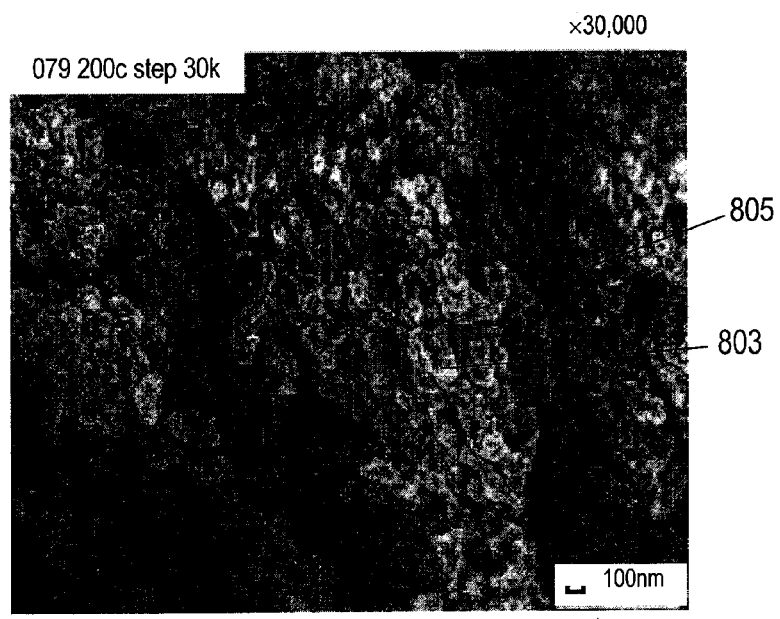
FIG. 15A is an enlarged view of the anode foil shown in FIG. 14.

FIGS. 14 and 15A are enlarged views of anode foil 201, microscopic photographs captured with scanning electron microscopes (SEM) and having magnifying powers of ten thousand and thirty thousand, respectively. As shown in FIGS. 14 and 15A, rough surface layer 201B is formed of plural tree structures 805 clustered together and extending from surface 1201A of anode base 201A. Each tree structure 805 branches into plural twigs, and is formed of plural fine particles 803 coupled to each other and linking to have a shape of a caulerpa lentillifera.

Figure 15B:
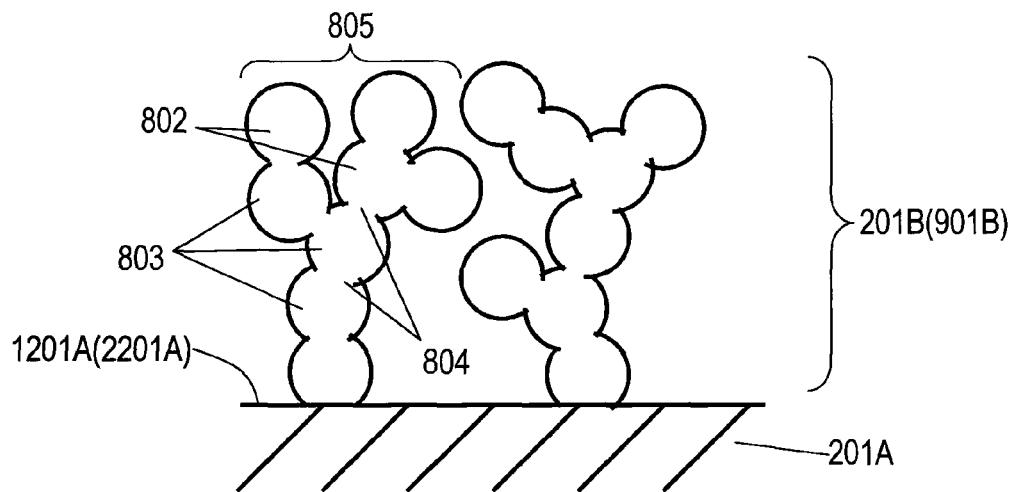
FIG. 15B is a schematic view of the anode foil shown in FIG. 15A.

FIG. 15B is a schematic view of anode foil 201. Rough surface layer 201B is formed of plural tree structures 805 clustered together and extending from surface 1201A of anode base 201A. Each tree structure 805 branches into plural twigs, and is formed of plural fine particles 803 coupled to each other and linking to have a shape of a caulerpa lentillifera.

Anode foil 201 shown in FIGS. 14, 15A and 15B can be manufactured by the following method. Anode base 201A is put into an evaporating oven having vacuum atmosphere. Argon gas and oxygen gas are put into the oven, thereby evaporating and depositing fine particles 603 of aluminum onto surface 1201A of anode base 201A, thereby forming rough surface layer 201B.

Figure 16:
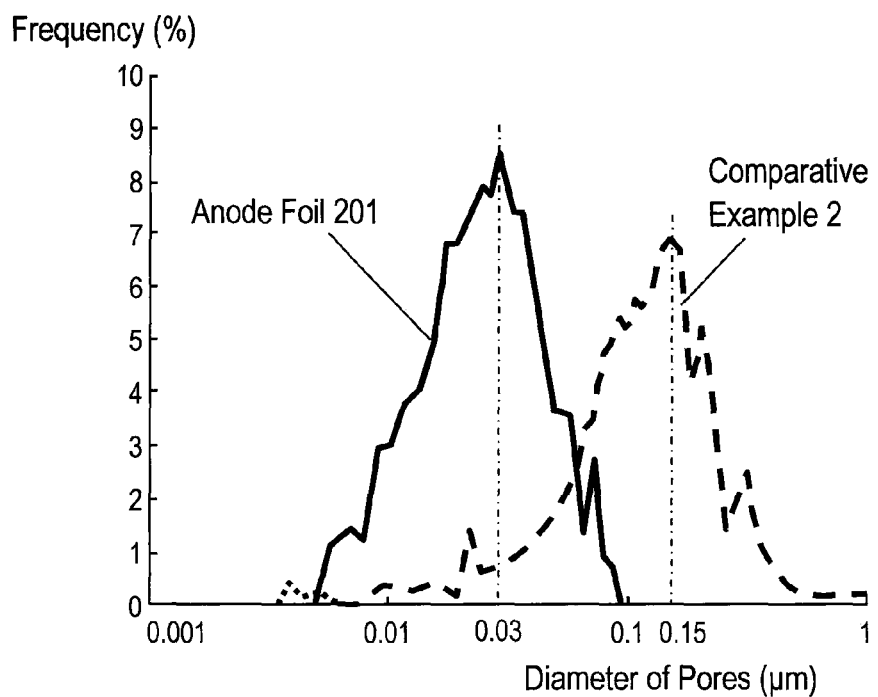
FIG. 16 shows a distribution of diameters of pores in the anode foil in accordance with Embodiment 5.

FIG. 16 shows a distribution of diameters of pores in rough surface layer 201B of anode foil 201 and a distribution of diameters of pores in a rough surface layer of Comparative Example 2 of an anode foil which is etched. The mode value of the diameters of the pores in anode foil 201 is about 0.03 μm, which is extremely smaller than the mode of Comparative Example 2 of about 0.15 μm. The surface area of anode foil 201 can be increased more than Comparative Example 2. Rough surface 201B is formed of tree structures 805 extending from anode base 201A, and can be impregnated with a larger amount of polymer solution than Comparative Example 2.

Tree structure 805 is branched into twigs 802 formed of fine particles 803 linked to have a shape of a caulerpa lentillifera. This structure increases the bonding strength between fine particles 803, thus prevents necks 804 partially thin between particles 803 from breaking. Thus, necks 804 do not break when rough surface layer 201B of anode foil 201 is anodized to form dielectric oxide layer 201C. This structure thus not only increases the mechanical strength but also reduces the decreasing of the capacitance, accordingly allowing the layered-type capacitor element to be readily manufactured.

Next, characteristics of anode foil 201 will be described in detail below.

Samples of anode foil 201 in accordance with Embodiment 5 were prepared. These samples are different in a mode value of diameters of pores and a thickness of rough surface layer 201B. Other samples of anode foil of Comparison Example 2 different in a thickness of the rough surface layer formed by etching were prepared. Each of the samples had an area of 10 cm$^2$. These samples were put into water solution containing 7% of ammonium adipate at a temperature of 70° C. for 20 minutes to anodize the samples under the condition of an anodizing voltage of 20V and a current density of 0.05 A/cm$^2$, thereby forming a dielectric oxide layer on the rough surface layer of each sample. Then, the samples were put into water solution containing 8% of ammonium borate at a temperature of 30° C. together with a reference electrode, and then were measured in the capacitance between the anode foil of each sample and the reference electrode at a frequency of 120 Hz with an impedance analyzer. The capacitance was measured as an anodization capacitance which is a characteristic particular to the anode foil of each sample. The condition for the anodizing and the measuring condition are not limited to the above conditions.

Figure 17:
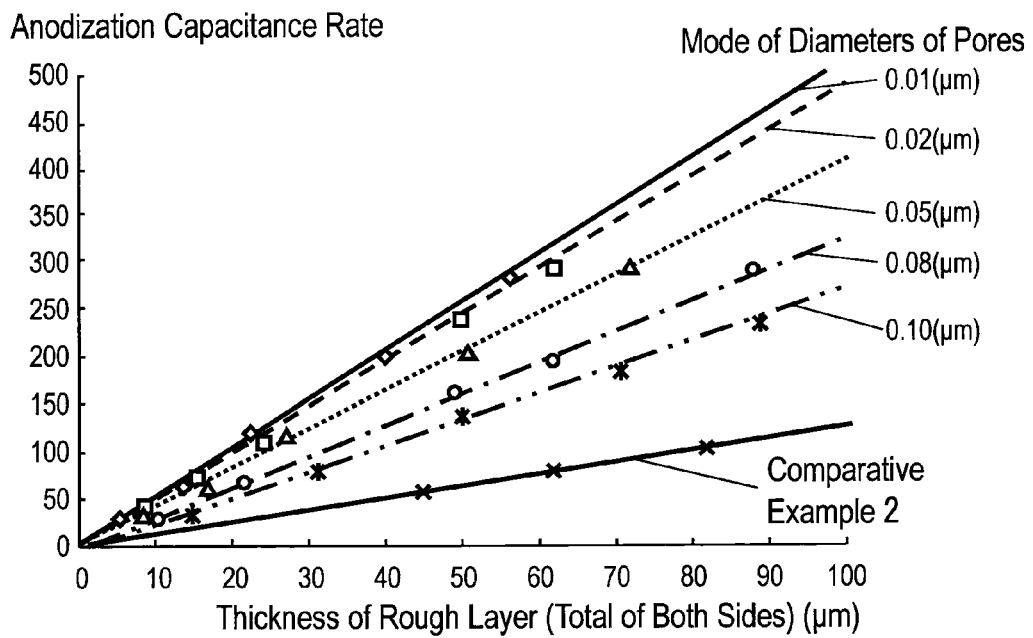
FIG. 17 shows characteristics of the anode foil in accordance with Embodiment 5.

FIG. 17 shows relations between the thickness (of total of both sides) of the rough surface layer of the anode foil having pores having various modes of diameters and an anodization capacitance rate. The anodization capacitance rate is defined to be a rate of an anodization capacitance of the samples to that of Comparative Example 2 including the rough surface layer of the anode foil having a thickness (of total of both sides) of 80 μm, assuming that the anodization capacitance of Comparative Example 2 is 100.

As shown in FIG. 17, the anodization capacitance rate increases proportionately to the thickness of the rough surface layer, and increases as the mode of the diameters of the pores decreases. The anodization capacitance of the sample of anode foil 201 according to Embodiment 5 is larger than that of Comparison Example 2 having the same thickness of the rough surface layer as that of the sample according to Embodiment 5. Anode foil 201 according to Embodiment 5 thus can have a smaller thickness and a larger capacitance than the foil roughened by an etching method. This advantage becomes more effective as the diameters of the pores become smaller since the smaller diameters of void pores produce the large surface area.

Next, separators 203 are provided onto dielectric oxide layer 201C anode foil 201 in accordance with Embodiment 5 and onto dielectric oxide layer 201C of the anode foil of Comparative Example 2. Cathode foils 202 are provided on the separators 203. Then, anode foil 201, separator 203, and cathode foil 202 are stacked together and put into polymer solution to produce capacitor element 204. Then, a capacitance between anode foil 201 and cathode foil 202 are measured as a product capacitance. Then, a product capacitance rate is calculated. The product capacitance rate is defined to be a rate of the product capacitance of capacitor element 204 to that of Comparative Example 2 including the anode foil having a thickness (total of both sides) of 80 μm, assuming that the product capacitance of Comparative Example 2 is 100.

Figure 18:
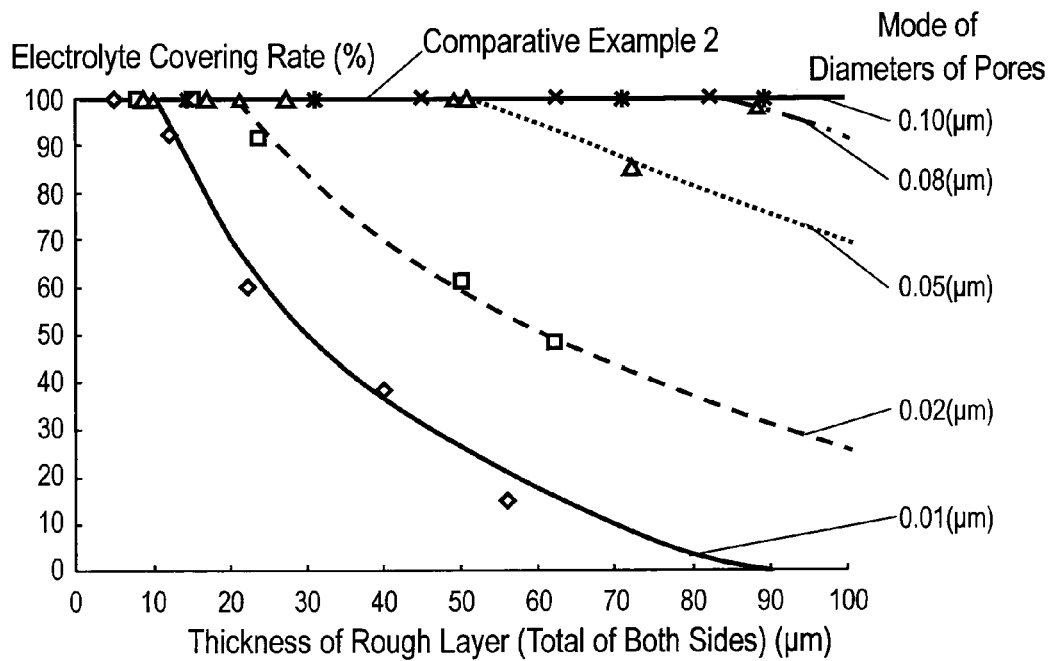
FIG. 18 shows characteristics of the anode foil in accordance with Embodiment 5.

FIG. 18 shows relations between the thickness (total of both sides) of rough surface layer 201B of anode foil 201 having various modes of the diameters of pores and an electrolyte covering rate (%). The electrolyte covering rate (%) is calculated by dividing the product capacitance rate by the anodization capacitance rate and multiplying the quotient by 100.

As shown in FIG. 18, the electrolyte covering rate decreases as the mode of the diameters of the pores decreases, and decreases as the thickness of rough surface layer 201B decreases. This is because a smaller mode of the diameters of the pores prevents the monomer of solid electrolyte 205 from impregnating into the pores, and yet, a large thickness of rough surface layer 201B further facilitates to prevent the monomer from impregnating into surface layer 201B.

Figure 19:
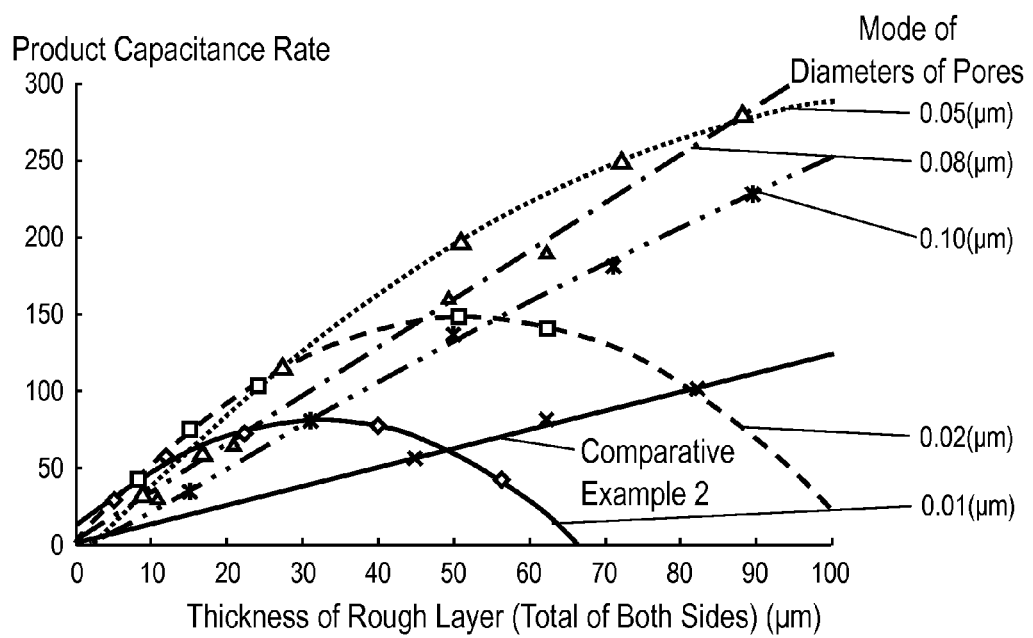
FIG. 19 shows characteristics of the solid electrolytic capacitor in accordance with Embodiment 5.

FIG. 19 shows the relation among the diameters of the pores, the thickness of the rough surface layer, and the product capacitance. This relation is determined by the relation among the diameters of the pores, the thickness of rough surface layer 201B and the anodization capacitance rate shown in FIG. 17 and by the relation among the diameters of the pores, the thickness of rough surface layer 201B and the electrolyte covering rate shown in FIG. 18. The sample having the largest anodization capacitance rate and the mode of 0.01 μm shown in FIG. 17 has a small electrolyte covering rate, as shown in FIG. 8. Those samples thus have the product capacitance rates do not exceed 100, as shown in FIG. 19. In other words, anode foil 201 having the mode of 0.01 μm cannot produce a larger capacitance than the electrolytic capacitor including the anode foil of Comparative Example 2.

Samples, out of the samples having the mode of the diameters of the pores of 0.02 μm, having the thickness of rough surface layer 201B ranging from 20 μm to 80 μm have product capacitance rates larger than 100. However, some of the samples, out of the samples having the mode of the diameters of the pores of 0.02 μm, having small thicknesses of rough surface layers do not necessarily have product capacitance rates larger than 100.

Even if having a product capacitance rate not exceeding 100, the samples have a capacitance per thickness of rough surface layer 201B exceeds that of the anode foil roughened by the etching method. Therefore, anode foil 201 having a thin rough surface layer 201B can provide a capacitor having a capacitance as large as the capacitor including the anode foil of Comparative Example 2 roughened by the etching method. A larger mode of diameters of the pores increases the electrolyte covering rate, providing a reliable electrolytic capacitance.

That is, in the case that the rough surface layer of the anode foil of Comparative Example 2 roughened by the etching method has a thickness (total of both sides) of 80 μm, an anode base, i.e. parts of the anode foil other than the rough surface layer needs a thickness not less than 25 μm in order to maintain the mechanical strength. The thickness of the anode foil of Comparative Example 2 thus is 105 μm. In anode foil 201 in accordance with Embodiment 1, the thickness of the rough surface layer (total of both sides) is 20 μm, so that the total thickness of anode foil 101 is 45 μm (=20 μm+25 μm). Anode foil 101 provides a capacitance which is provided by the anode foil of Comparative Example 2 having the thickness of 80 μm. Since thicker anode base 201A reduces an equivalent series resistance (ESR), the thicknesses of both of rough surface layer 201B and anode base 201A can be designed based on a desirable capacitance and ESR so that a greater margin for the design can be obtained.

As discussed above, the mode of the diameters of the pores of anode foil 201 in accordance with Embodiment 5 ranges from 0.02 μm to 0.10 μm, and the thickness (total of both sides) of the rough surface layer ranges from 20 μm to 80 μm. The product capacitance rate of anode foil 201 sufficiently exceeds 100. In other words, solid electrolytic capacitor 1001 including anode foil 201 is thinner and has a larger capacitance than Comparative Example 2 including the anode foil which is roughened by the etching method and which has a thickness of 80 μm.

Nickel layer 202B containing nickel and nickel oxide can be formed on surface 1202A of cathode base 202A having a thickness of 50 μm and made of highly-pure aluminum foil by evaporating fine particles of nickel onto surface 1202A in vacuum atmosphere. Nickel layer 202B can be formed by a dry process method, such as a sputtering method or a CVD method, other than the above method. Thinner cathode base 102A reduces the size of solid electrolytic capacitor 2001. Thicker cathode base 202A reduces the ESR of capacitor 2001.

FIG. 13 shows rough surface layer 201B provided on surface 1201A of anode base 201A, dielectric oxide layer 201C provided on rough surface layer 201B, and nickel layer 202B provided on surface 1202A of cathode base 202A. Capacitor element 204 in accordance with Embodiment 5 includes rough surface layer 901B, similar to rough surface layer 201B, on surface 2201A of anode base 201A opposite to surface 1201A. Dielectric oxide layer 901C, similar to dielectric oxide layer 201C, is provided on rough surface layer 901B. Nickel layer 902B, similar to nickel layer 202B, is provided on surface 2202A of cathode base 202A opposite to surface 1202A.

Figure 20:
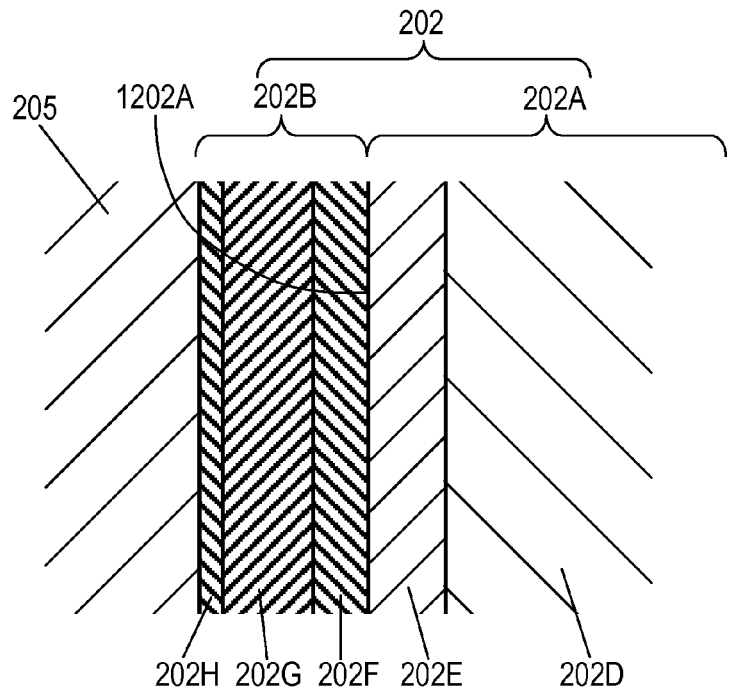
FIG. 20 is an enlarged cross-sectional view of a cathode foil of the solid electrolytic capacitor in accordance with Embodiment 5.

FIG. 20 is an enlarged view of cathode foil 202. Cathode base 202A made of aluminum foil includes base foil 202D made of aluminum foil, and base oxide layer 202E provided on base foil 202D. The oxide layer is formed on surface 1202A of cathode base 202A. The aluminum of base foil 202D is oxidized naturally to provide the oxide layer. Nickel layer 202B is made of nickel and nickel oxide (Ni—O) and includes core layer 202G made of nickel, nickel oxide layer 202H made of nickel oxide, and diffusion layer 202F provided between core layer 202G and base oxide layer 202E. Nickel oxide layer 202H is made of nickel, aluminum, and oxygen, and contacts core layer 202G and solid electrolyte 205. Diffusion layer 202F is provided on surface 1202A of cathode base 202A, that is, on base oxide layer 202E, and contacts core layer 202G.

Cathode foil 202 can be manufactured by the following evaporating method. A highly-pure aluminum foil having a thickness of 50 μm is used as cathode base 202A. Base oxide layer 202E is formed on base foil 202D by natural oxidation. Fine particles of nickel are evaporated onto surface 1202A of cathode base 202A, i.e. on base oxide layer 202E, in a vacuum atmosphere by adjusting the concentration of oxygen. This evaporation forms nickel layer 202B including diffusion layer 202F formed on surface 1202A of cathode base 202A, i.e., on base oxide layer 202E, core layer 202G formed on diffusion layer 202F made of nickel, and nickel oxide layer 202H formed on core layer 202G and made of nickel oxide (Ni—O). According to Embodiment 5, nickel layer 202B has a thickness of 0.1 μm, and nickel oxide layer 202H has a thickness about 1/10 thick the thickness of nickel layer 202B.

Nickel layer 202B can be formed by a dry process method, such as a sputtering method or a CVD method, other than the above method, providing the same effects. Thinner base foil 202D reduces the size and ESR of capacitor element 204.

Nickel oxide layer 202H protects cathode foil 202 from corrosion, so that cathode foil 202 and solid electrolyte 205 can bond together with large strength.

Diffusion layer 202F is made of aluminum contained in base foil 202A and nickel melted and coupled with oxygen due to heat generated during the forming of nickel layer 202B by evaporation. Diffusion layer 102F bonds nickel layer 202B to cathode base 202A with large strength, and allows nickel layer 202B to be thin easily. Thus, solid electrolytic capacitor 2001 with a large capacitance and a small ESR is provided with a structure at a lower cost.

Figures 21, 22:
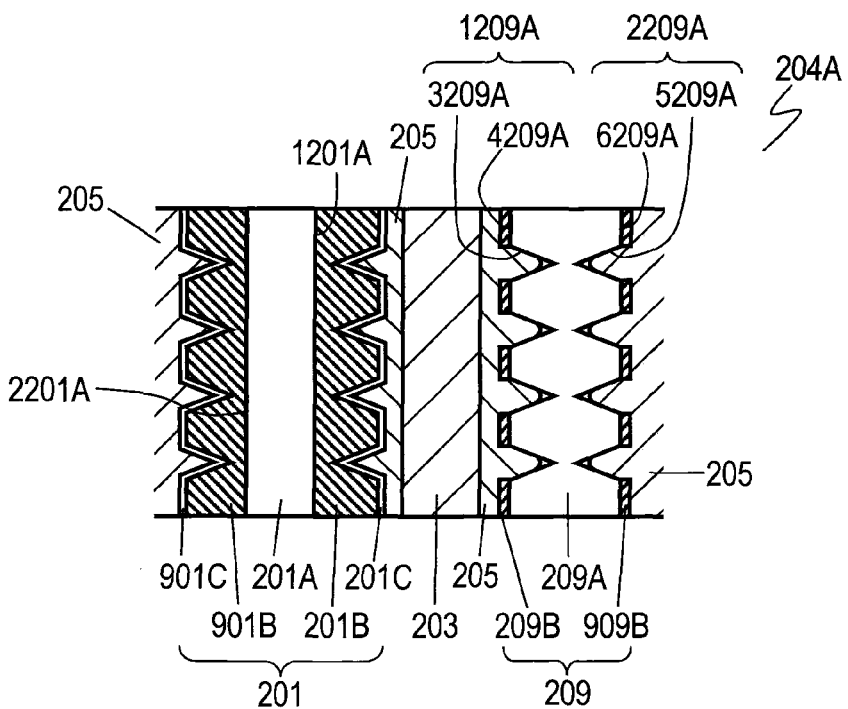
FIG. 21 shows a capacitance and an equivalent series resistance of the solid electrolytic capacitor in accordance with Embodiment 5.
FIG. 22 is a schematic cross-sectional view of a capacitor element of a solid electrolytic capacitor in accordance with Exemplary Embodiment 7 of the invention.
Figure 23:
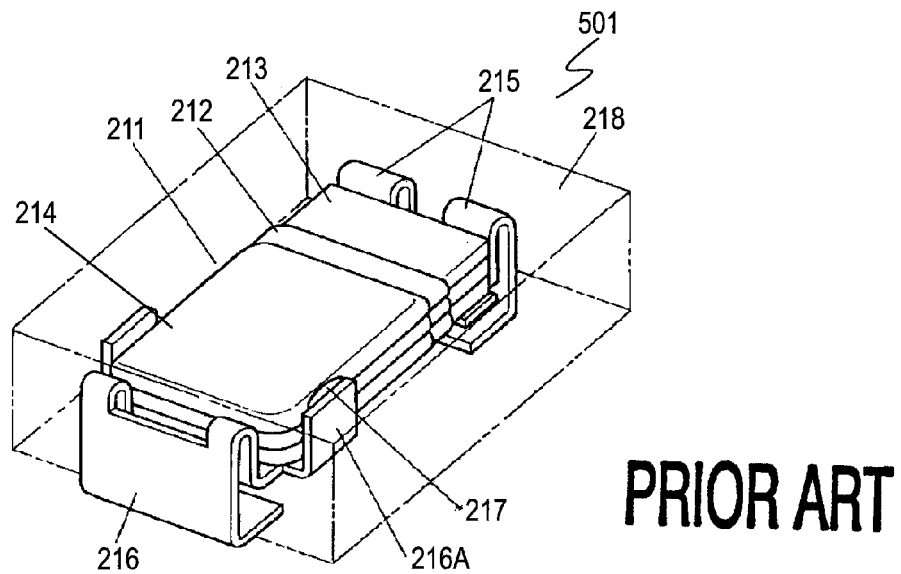
FIG. 23 shows a perspective view of a conventional solid electrolytic capacitor.
Figure 24:
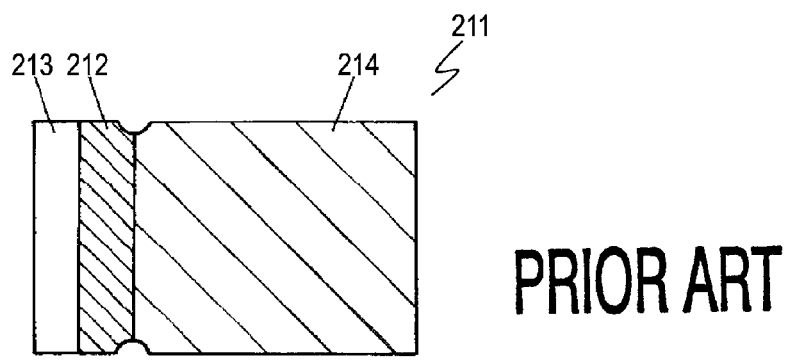
FIG. 24 shows a plan view of a capacitor element of the conventional solid electrolytic capacitor.

FIG. 21 shows measurement results of capacitances and ESRs of solid electrolytic capacitor 2001 in accordance with Embodiment 4 and the capacitor including the anode foil of Comparison Example 2. The cathode foil of Comparative Example 2 does not include a nickel layer made of nickel and nickel oxide.

As shown in FIG. 21, capacitor 2001 has a capacitance about 1.9 times the capacitance of the capacitor of Comparative Example 2, and has an ESR about ¾ the ESR of Comparison Example 2. Capacitor 2001 in accordance with Embodiment 5 thus has an excellent performance. Since solid electrolytic capacitor 2001 has cathode foil 202 having nickel layer 202B made of nickel and nickel oxide and formed on the surface of cathode foil 202, no electrostatic capacitance is generated in cathode foil 202. The capacitance generated at anode foil 201 of capacitor element 204 is thus not connected in series with any capacitance, so that capacitor 2001 can have a large capacitance.

The nickel oxide contained in nickel layer 202B is semiconductor and has electrical conductivity, so that this nickel oxide reduces the ESR of capacitor 2001. The nickel oxide is not affected by the heat for carbonizing separator 203 or by the oxidation due to the heat in the reflow process, hence not increasing the ESR. The nickel oxide on the surface of nickel layer 202B protects nickel layer 202B from corrosion, so that nickel layer 202B and solid electrolyte 205 can bond together with large strength.

Heat is generated when nickel layer 202B is evaporated on cathode base 202A. The heat forms alloy of nickel contained in nickel layer 202B and aluminum contained in cathode base 202A, so that nickel layer 202B and cathode base 202A can be bonded together with large strength. Since nickel layer 202B is evaporated on cathode base 202A, nickel layer 202B can be thin easily, hence providing solid electrolytic capacitor 2001 inexpensively with a large capacitance and a small ESR.

According to Embodiment 5, nickel layer 202B has a thickness of 0.1 µm; however, this layer can be thinner or thicker. Since the thicker layer raises the cost, the thickness is preferably not larger than 0.5 µm. Nickel layer 202B having a thickness of 0.1 µm provides the effects.

According to Embodiment 5, separator 203 made of carbonized electrolytic paper mainly made of cellulose fiber. Separator 203 can be processed by a reinforcement process in which poly-acrylic amid or its derivative is added to the cellulose fiber, or by a hydrophobic surface treatment by using silane coupling agent. One of these processes prevents separator 203 from being carbonized even at a high temperature of 300° C., thereby providing solid electrolytic capacitor 2001 with desired characteristics.

Separator 203 can be made mainly of chemical fiber. Solid electrolyte 205 can be unevenly distributed in the cellulose fiber; however, can be evenly impregnated in the chemical fiber, accordingly reducing the impedance at high frequencies. The chemical fiber can be made of polyethylene terephthalate, acryl, nylon, polyvinyl alcohol or their derivatives since they are stable against polymer solution used for forming solid electrolyte 205 and have large heat resistance. Mixed fiber of the polyethylene terephthalate and its derivative and mixed fiber of polyethylene terephthalate and polyvinyl alcohol can be mixed easily with polyethylenedioxy thiophene contained in solid electrolyte 205, so that those mixed fiber can closely and strongly bond separator 103 to solid electrolyte 205. Separator 203 made of those mixed fiber allows solid electrolytic capacitor 2001 to have a smaller impedance than separator 203 formed of carbonized electrolytic paper mainly made of cellulose fiber by more than 10% at high frequencies.

Capacitor element 204 of solid electrolytic capacitor 2001 in accordance with Embodiment 5 is heated to carbonize separator 203. However, separator 203 can is heated to be carbonized, and then, is stacked on anode foil 201 and cathode foil 202, thereby forming capacitor element 204.

Exemplary Embodiment 6

A Solid Electrolytic Capacitor in Accordance with Exemplary Embodiment 6 includes nickel layer 202B, made of nickel and nickel oxide, provided only on surface 1202A of cathode base 202A of cathode foil 202 shown in FIG. 13. No nickel layer is formed on surface 2202A of cathode base 202A, and surface 2202A contacts solid electrolyte 205. FIG. 21 shows measurement results of a capacitance and an equivalent series resistance (ESR) of the solid electrolytic capacitor in accordance with Embodiment 6 similar to the capacitor according to Embodiment 5 As FIG. 21 shows, the capacitor according to Embodiment 6 has a capacitance about 1.8 times the capacitance of Comparative Example 2 and has an ESR about 9/10 the ESR of Comparison Example 2. The capacitor in accordance with Embodiment 6 thus has an excellent performance. Nickel layer 202B provided only on surface 1202A of cathode base 202A prevents surface 2202A from having a capacitance produced at the surface.

However, since nickel layer 202B is formed on surface 1202A of cathode base 202A but not on surface 2202A, the ESR of this capacitor is larger than that of the capacitor in accordance with Embodiment 5.

Exemplary Embodiment 7

FIG. 22 is a schematic cross-sectional view of capacitor element 204A of a solid electrolytic capacitor in accordance with Exemplary Embodiment 7 of the present invention. In FIG. 22, components identical to those of capacitor element 204 shown in FIG. 13 are denoted by the same reference numerals, and their descriptions will be omitted. Capacitor element 204A includes cathode foil 209 instead of cathode foil 202 of capacitor element 204 shown in FIG. 13. Cathode foil 209 includes cathode base 209A made of aluminum foil and nickel layer 209B formed on surface 1209A of cathode base 209A and made of nickel and nickel oxide. Surface 1209A of cathode base 209A is roughened by an etching process to have a large number of pores 3209A provided therein. Nickel layer 209B is provided on portion 4209A of surface 1209A having no pore therein. Nickel layer 209B is not provided inside pores 3209A. Solid electrolyte 205 contacts pores 3209A of cathode base 209A.

Capacitor element 204A in accordance with Embodiment 7 includes rough surface layer 901B, similar to rough surface layer 201B, on surface 2201A of anode base 201A opposite to surface 1201A. Dielectric oxide layer 901C, similar to dielectric oxide layer 201C, is provided on rough surface layer 901B. Nickel layer 909B, similar to nickel layer 209B, is provided on surface 2209A of cathode base 209A opposite to surface 1209A. Surface 2209A is roughened by an etching process, to have a large number of pores 5209A formed therein. Nickel layer 909B is provided on portion 6209A of surface 2209A having no pore therein, so that nickel layer 909B is not provided inside pores 5209A. Solid electrolyte 205 contacts pores 5209A of cathode base 209A.

Cathode foil 209 has a structure similar to that of cathode foil 102 in accordance with Embodiment 5 shown in FIG. 10. A highly-pure aluminum foil having a thickness of 50 µm is used as cathode base 209A. Surfaces 1209A and 2209A are roughened by the etching process to form numerous pores 3209A and 5209A in the surfaces. Then, nickel layers 209B and 909B are formed on portions 4209A and 6209A of surfaces 1209A and 2209A, respectively. Nickel layers 209B and 909B have structures similar to that of nickel layer 102 shown in FIG. 10, and are formed by a similar method way to that for nickel layer 102. According to Embodiment 7, nickel layers 209B and 909B have a thickness of 0.1 µm.

FIG. 21 shows measurement results of a capacitance and an equivalent series resistance (ESR) of the solid electrolytic capacitor in accordance with Embodiment 7. This capacitor has a capacitance about 2.0 times the capacitance of Comparative Example 2, and has an ESR about 3/5 the ESR of Comparison Example 2. The capacitor according to Embodiment 7 thus has an excellent performance. Surface 1209A of cathode foil 209 is roughened to enlarge its area, accordingly reducing the ESR.

Exemplary Embodiment 8

A solid electrolytic capacitor in accordance with Exemplary Embodiment 8 includes nickel layer 209B made of nickel and nickel oxide and formed on surface 1209A of cathode base 209A as shown in FIG. 22. Surface 2209A of cathode base 209A opposite to surface 1209A does not include a nickel layer thereon but contacts solid electrolyte 105. FIG. 21 shows measurement results of a capacitance and an equivalent series resistance (ESR) of this solid electrolytic capacitor.

As shown in FIG. 21, the solid electrolytic capacitor in accordance with Embodiment 8 has a capacitance about 1.8 times the capacitance of Comparative Example 2, and has an ESR about 6/7 the ESR of Comparative Example 2. This capacitor according to Embodiment thus has an excellent performance. Nickel layer 202B formed only on surface 1209A of cathode base 209A prevents surface 2209 having a nickel layer thereon from having a capacitance from being produced thereon.

However, nickel layer 202B is formed on surface 1209A of cathode base 209A but not formed on surface 2209A, and causes the ESR of this capacitor in accordance with Embodiment 8 to be larger than that of the capacitor in accordance with Embodiment 7.

INDUSTRIAL APPLICABILITY

A solid electrolytic capacitor according to the present invention has a large capacitance and a low equivalent series resistance, and can be manufactured inexpensively with high reliability. The capacitor is thus useful as an electrolytic capacitor to be used in various electronic devices.

The invention claimed is:

1. A solid electrolytic capacitor comprising:
an anode foil;
an solid electrolyte provided on the anode foil and made of conductive polymer; and
a cathode foil provided on the solid electrolyte and facing the anode foil across the solid electrolyte, wherein
the anode foil includes
an anode base made of aluminum,
a first rough surface layer made of aluminum and provided on a first surface of the anode base, and
a first dielectric oxide layer provided on the first rough surface layer and contacting the solid electrolyte,
the cathode foil includes
a cathode base made of aluminum, and
a nickel layer provided on a surface of the cathode base and contacting the solid electrolyte, the nickel layer facing the first dielectric oxide layer of the anode foil across the solid electrolyte, the nickel layer being made of nickel and nickel oxide,
the surface of the cathode foil is roughened and has a plurality of pores therein, and
the nickel layer is not formed inside the plurality of pores in the surface of the cathode foil.

2. The solid electrolytic capacitor according to claim 1, wherein a mode of diameters of pores in the first rough surface layer of the anode foil ranges from 0.02 to 0.10 μm.

3. The solid electrolytic capacitor according to claim 2, further comprising:
a second rough surface layer provided on a second surface of the anode base opposite to the first surface of the anode base, the second rough surface layer being made of aluminum; and
a second dielectric oxide layer provided on the second rough surface layer, wherein
a mode of diameters of pores in the second rough surface layer ranges from 0.02 to 0.1 μm, and
a total of thicknesses of the first and the second rough surface layers ranges from 20 to 80 μm.

4. The solid electrolytic capacitor according to claim 3, wherein the second rough surface layer includes a plurality of tree structures extend from the second surface of the anode base, each of the plurality of tree structures comprising a plurality of fine particles of aluminum, link to one after another, and branch into a plurality of twigs.

5. The solid electrolytic capacitor according to claim 1, further comprising:
a second rough surface layer provided on a second surface of the anode base opposite to the first surface of the anode base, the second rough surface layer being made of aluminum; and
a second dielectric oxide layer provided on the second rough surface layer.

6. The solid electrolytic capacitor according to claim 5, wherein the second rough surface layer includes a plurality of tree structures extend from the second surface of the anode base, each of the plurality of tree structures comprising a plurality of fine particles of aluminum, link to one after another, and branch into a plurality of twigs.

7. The solid electrolytic capacitor according to claim 1, wherein the first rough surface layer includes a plurality of tree structures extend from the first surface of the anode base, each of the plurality of tree structures comprising a plurality of fine particles of aluminum, link to one after another, and branch into a plurality of twigs.

8. The solid electrolytic capacitor according to claim 1, further comprising an insulating separator provided between the anode foil and the cathode foil, wherein the solid electrolyte is impregnated into the separator.

9. The solid electrolytic capacitor according to claim 8, wherein the separator is made of electrolytic paper mainly made of cellulose fiber.

10. The solid electrolytic capacitor according to claim 9, wherein the electrolytic paper of the separator is carbonized.

11. The solid electrolytic capacitor according to claim 8, wherein the separator is made mainly of chemical fiber.

12. The solid electrolytic capacitor according to claim 8, wherein the anode foil, the cathode foil, the solid electrolyte, and the separator are rolled together to provide a capacitor element, said solid electrolytic capacitor further comprising:
a case having an opening and accommodating the capacitor element; and
a sealing member for sealing the opening of the case.

13. The solid electrolytic capacitor according to claim 8, wherein the anode foil, the cathode foil, the solid electrolyte, and the separator are stacked together.

14. A method for manufacturing a solid electrolytic capacitor, comprising:
providing a rough surface layer made of aluminum on a surface of an anode base made of aluminum;
providing a dielectric oxide layer on the rough surface layer;
forming a nickel layer made of nickel and nickel oxide on a surface of a cathode base made of aluminum by evaporation; and
providing a solid electrolyte between the dielectric oxide layer and the nickel layer such that the solid electrolyte contacts the dielectric oxide layer and the nickel layer, wherein the surface of the cathode base is roughened and has a plurality of pores therein, and the nickel layer is not formed inside the plurality of pores in the surface of the cathode base.

15. A solid electrolytic capacitor comprising:
an anode foil;
an solid electrolyte provided on the anode foil and made of conductive polymer; and
a cathode foil provided on the solid electrolyte and facing the anode foil across the solid electrolyte, wherein
the anode foil includes:
   an anode base made of aluminum;
   a rough surface layer made of aluminum and provided on a surface of the anode base; and
   a dielectric oxide layer provided on the rough surface layer and contacting the solid electrolyte,
the cathode foil includes:
   a cathode base made of aluminum; and
   a nickel layer provided on a surface of the cathode base and contacting the solid electrolyte, the nickel layer facing the dielectric oxide layer of the anode foil across the solid electrolyte, the nickel layer being made of nickel and nickel oxide, and
the rough surface layer includes a plurality of tree structures extend from the surface of the anode base, each of the plurality of tree structures comprising a plurality of fine particles of aluminum, link to one after another, and branch into a plurality of twigs.

16. A method for manufacturing a solid electrolytic capacitor, comprising:
providing a rough surface layer made of aluminum on a surface of an anode base made of aluminum;
providing a dielectric oxide layer on the rough surface layer;
forming a nickel layer made of nickel and nickel oxide on a surface of a cathode base made of aluminum by evaporation; and
providing a solid electrolyte between the dielectric oxide layer and the nickel layer such that the solid electrolyte contacts the dielectric oxide layer and the nickel layer, wherein
the rough surface layer includes a plurality of tree structures extend from the surface of the anode base, each of the plurality of tree structures comprising a plurality of fine particles of aluminum, link to one after another, and branch into a plurality of twigs.

* * * * *